(12) United States Patent
Da Silva et al.

(10) Patent No.: US 12,192,047 B2
(45) Date of Patent: *Jan. 7, 2025

(54) USER EQUIPMENT, BASE STATION AND METHODS IN A RADIO COMMUNICATIONS NETWORK

(71) Applicant: Telefonaktiebolaget LM Ericsson (publ), Stockholm (SE)

(72) Inventors: Icaro L. J. Da Silva, Solna (SE); Claes Tidestav, Bålsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/537,028

(22) Filed: Dec. 12, 2023

(65) Prior Publication Data
US 2024/0205071 A1    Jun. 20, 2024

Related U.S. Application Data

(63) Continuation of application No. 18/111,936, filed on Feb. 21, 2023, now Pat. No. 11,916,724, which is a
(Continued)

(51) Int. Cl.
*H04L 12/24* (2006.01)
*H04B 7/06* (2006.01)
(Continued)

(52) U.S. Cl.
CPC ....... *H04L 41/0654* (2013.01); *H04B 7/0617* (2013.01); *H04B 7/0695* (2013.01);
(Continued)

(58) Field of Classification Search
CPC . H04L 41/0654; H04L 5/0048; H04L 7/0008; H04L 43/16; H04L 69/28;
(Continued)

(56) References Cited

U.S. PATENT DOCUMENTS 9,425,923 B2   8/2016  Ratasuk et al.
10,257,070 B2  4/2019  Zhang et al.
(Continued)

FOREIGN PATENT DOCUMENTS

| RU | 2592872 C2 | 7/2016 |
| RU | 2015125777 A | 2/2017 |
| WO | 2013163902 A1 | 11/2013 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.0.0, Dec. 2017, 1-338.
(Continued)

*Primary Examiner* — Hoang-Chuong Q Vu
(74) *Attorney, Agent, or Firm* — Murphy, Bilak & Homiller, PLLC

(57) ABSTRACT

According to a first aspect of embodiments herein, the object is achieved by a method performed by a User Equipment (UE) for monitoring a beam transmitted by a base station in a radio communications network. The base station is serving the UE. The UE monitors a reference signal related to the beam, from the base station. Each time a quality of the reference signal is below a first threshold, the UE generates an Out-Of-Synchronization (OOS) event. When the number of OOS events reaches an OOS Beam Failure Detection (BFD) threshold, the UE triggers a beam recovery preparation procedure, and when the number of OOS events reaches an OOS Radio Link Monitoring (RLM), threshold, the UE starts an RLF timer.

14 Claims, 17 Drawing Sheets

Related U.S. Application Data continuation of application No. 17/313,466, filed on May 6, 2021, now Pat. No. 11,616,684, which is a continuation of application No. 15/761,332, filed as application No. PCT/SE2018/050186 on Feb. 27, 2018, now Pat. No. 11,005,701.

(60) Provisional application No. 62/501,823, filed on May 5, 2017.

(51) Int. Cl.

| | | |
|---|---|---|
| *H04L 5/00* | (2006.01) | |
| *H04L 7/00* | (2006.01) | |
| *H04L 12/26* | (2006.01) | |
| *H04L 29/06* | (2006.01) | |
| *H04L 41/0654* | (2022.01) | |
| *H04L 43/16* | (2022.01) | |
| *H04L 69/28* | (2022.01) | |
| *H04B 7/0413* | (2017.01) | |

(52) U.S. Cl.
CPC .......... *H04L 5/0048* (2013.01); *H04L 7/0008* (2013.01); *H04L 43/16* (2013.01); *H04L 69/28* (2013.01); *H04B 7/0413* (2013.01)

(58) Field of Classification Search
CPC .. H04B 7/0617; H04B 7/0695; H04B 7/0413; H04B 7/088; H04B 7/0619
See application file for complete search history.

(56) References Cited

U.S. PATENT DOCUMENTS

| 12,068,909 B2 * | 8/2024 | Pan .................. H04L 5/0048 |
|---|---|---|
| 2013/0021923 A1 | 1/2013 | Morgan et al. |
| 2015/0071056 A1 | 3/2015 | Yi et al. |
| 2015/0078335 A1 | 3/2015 | Sivanesan et al. |
| 2015/0131544 A1 | 5/2015 | Behravan et al. |
| 2015/0215077 A1 | 7/2015 | Ratasuk et al. |
| 2016/0353510 A1 | 12/2016 | Zhang et al. |
| 2018/0007574 A1 | 1/2018 | Park et al. |
| 2018/0007575 A1 | 1/2018 | Singhal et al. |
| 2018/0132300 A1 | 5/2018 | Mering et al. |
| 2018/0191416 A1 | 7/2018 | Palenius et al. |
| 2018/0249526 A1 | 8/2018 | Nagaraja et al. |
| 2018/0269950 A1 | 9/2018 | John Wilson et al. |
| 2018/0302889 A1 | 10/2018 | Guo et al. |
| 2018/0324702 A1 | 11/2018 | Takahashi et al. |
| 2019/0132778 A1 | 5/2019 | Park et al. |
| 2019/0200249 A1 | 6/2019 | Yoon et al. |
| 2019/0327634 A1 | 10/2019 | Lee et al. |
| 2019/0349960 A1 | 11/2019 | Li et al. |
| 2019/0387440 A1 | 12/2019 | Yiu et al. |
| 2020/0028545 A1 * | 1/2020 | Koskela ............... H04B 7/0408 |
| 2020/0059398 A1 * | 2/2020 | Pan ..................... H04W 56/001 |
| 2020/0067589 A1 | 2/2020 | Jeong et al. |
| 2020/0128467 A1 | 4/2020 | Gao et al. |
| 2021/0359900 A1 | 11/2021 | Pan et al. |
| 2021/0392634 A1 | 12/2021 | Guo et al. |
| 2023/0090971 A1 | 3/2023 | Yiu et al. |

OTHER PUBLICATIONS

3GPP , "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.0.0, Dec. 2017, 1-109.

3GPP , "3rd Generation Partnership Project; Technical Specification Group Radio Access Network; NR; NR and NG-RAN Overall Description; Stage 2 (Release 15)", 3GPP TS 38.300 V15.0.0, Dec. 2017, 1-68.

3GPP , "3rd Generation Partnership Project; Technical Specification Group Radio Access Network; NR; Physical layer procedures for control (Release 15)", 3GPP TS 38.213 V15.0.0, Dec. 2017, 1-56.

Unknown, Author , "Beam recovery in NR", 3GPP TSG-RAN WG2 Meeting #97bis R2-1702678, Spokane, U.S., Apr. 3-7, 2017, 1-4.

Unknown, Author , "Radio link monitoring, beam failure and radio link failure", 3GPP TSG RAN WG2#bis R2-1703423, Spokane, USA, Apr. 3-7, 2017, 1-5.

Unknown, Author , "RLM and RLF in HF NR", MediaTek Inc., 3GPP TSG-RAN WG2 Meeting 97bis, R2-1702770, Spokane, USA, Apr. 3-7, 2017, 1-6.

Unknown, Author , "RLM and RLF in NR", 3GPP TSG-RAN WG2 #97bis Tdoc R2-1702677, Spokane, USA, Apr. 3-7, 2017, 1-5.

* cited by examiner

Time:  t1        t2      ...    tn

Time:  t1        t2      ...    tn

USER EQUIPMENT, BASE STATION AND METHODS IN A RADIO COMMUNICATIONS NETWORK

TECHNICAL FIELD

Embodiments herein relate to a User Equipment (UE) a base station and methods therein. In particular, they relate to for monitoring a beam transmitted by a base station in a radio communications network and for configuring a UE to monitor a beam transmitted the a base station in a radio communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Multi-Antenna Schemes in NR

Multi-antenna schemes for NR are currently being discussed in 3GPP. For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore MIMO schemes for NR are also called massive MIMO. For around 30/70 GHz, up to 256 Transmit (Tx) and Receive (Rx) antenna elements are assumed. Extension to support 1024Tx at 70 GHz is agreed and it is under discussion for GHz. For sub-6 GHz communication, to obtain more beamforming and multiplexing gain by increasing the number of antenna elements is also a trend.

With massive MIMO, three approaches to beamforming have been discussed: analog, digital, and hybrid which is a combination of the two.

The analog beamforming would compensate high pathloss in NR scenarios, while digital precoding would provide additional performance gains similar to MIMO for carrier frequencies below 6 GHz, so-called sub-6 GHz scenarios. The implementation complexity of analog beamforming is significantly less than digital precoding. This is since it relies on simple phase shifters. However, the drawbacks are its limitation in multi-direction flexibility, i.e. only a single beam can be formed at a time and the beams are then switched in time domain. Only wideband transmissions, i.e. not possible to transmit over a subband, unavoidable inaccuracies in the analog domain, etc.

Digital beamforming used today in LTE, requires costly converters to and/or from the digital domain from and/or to IF domain. However, it provides the best performance in terms of data rate and multiplexing capabilities wherein multiple beams over multiple subbands at a time can be formed, but at the same time it is challenging in terms of power consumption, integration, and cost; in addition to that the gains do not scale linearly with the number of transmit and/or receive units while the cost is growing rapidly.

Supporting hybrid beamforming, to benefit from cost-efficient analog beamforming and high-capacity digital beamforming, is therefore desirable for NR. An example diagram for hybrid beamforming is shown in FIG. 1, wherein IFFT means Inverse Fourier transform,
  P/S means parallel to serial conversion,
  DAC means Digital Analogue Converter, and
  PA means power amplifier.

Beamforming may be on transmission beams and/or reception beams, network side or UE side.

Beam Sweeping

The analog beam of a subarray may be steered toward a single direction in each OFDM symbol, and hence the number of subarrays determines the number of beam directions and the corresponding coverage on each OFDM symbol. However, the number of beams to cover the whole serving area is typically larger than the number of subarrays, especially when the individual beam-width is small, also referred to as narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently steered beams can be transmitted through subarrays, may be assigned and periodically transmitted.

FIG. 2 Depicts Tx beam sweeping on 2 subarrays

FIG. 3 depicts Tx beam sweeping on 3 subarrays.

Synchronisation Signal (SS) Block Configuration

Herein a non-limiting example of SS block and SS burst configuration is described which may be assumed in other embodiments.

SS block: NR-PSS, NR-SSS and/or NR-PBCH can be transmitted within an SS block. For a given frequency band, an SS block corresponds to N OFDM symbols based on a certain e.g. a default subcarrier spacing, and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks.

SS burst: One or multiple SS block(s) compose an SS burst. The maximum number of SS-blocks, L, within SS burst set may be carrier frequency dependent, e.g.:

For frequency range category #A (e.g., 0~6 GHz), the number (L) is TBD within L≤[16]

For frequency range category #B (e.g., 6~60 GHz), the number is TBD within L≤[128]

SS burst set: One or multiple SS block(s) compose an SS burst set. The maximum number of SS-blocks, L, within SS burst set may be carrier frequency dependent, e.g.

For frequency range category #A (e.g., 0-3 GHz), the number (L) is L=4

For frequency range category #B (e.g., 3-6 GHz), the number (L) is L=8

For frequency range category #A (e.g., 6-60 GHz), the number (L) is L=64

SS burst set transmission: From physical layer specification perspective, at least one periodicity of SS burst set is supported. From UE perspective, SS burst set transmission is periodic. At least for initial cell selection, a UE may assume a default periodicity of SS burst set transmission for a given carrier frequency, e.g. one of 5 ms, 10 ms, 20 ms, 40 ms, 80 ms, or 160 ms. The UE may assume that a given SS block is repeated with a SS burst set periodicity. By default, the UE may neither assume the gNB transmits the same number of physical beam(s), nor the same physical beam(s) across different SS-blocks within an SS burst set.

For each carrier, the SS blocks may be time-aligned or overlap fully or at least in part, or the beginning of the SS blocks may be time-aligned, e.g. when the actual number of transmitted SS blocks is different in different cells.

FIG. 4 depicts Example configuration of SS blocks, SS bursts and SS burst sets/series.

Mobility and Beam Management in NR

In NR it has been agreed that there will be two levels of mobility, one without involving Radio Resource Control (RRC), also called intra-cell mobility, part of what is often called beam management, and another type of mobility involving RRC, also called cell level mobility. Cell Level Mobility is described as follows in the TS 38.300 specifications.

Cell Level Mobility requires explicit RRC signalling to be triggered, i.e. handover. Handover signalling procedures adopt the same principle as Release 13 E-UTRAN as specified in 3GPP TS 36.300. For inter-gNB handover, the signalling procedures consist of at least the following elemental components illustrated in FIG. 5, Inter-gNB handover procedures.

1. The source gNB initiates handover and issues a Handover Request over the Xn interface. The Xn interface is the interface between gNBs.

2. The target gNB performs admission control and provides an RRC configuration as part of the Handover Acknowledgement.

3. The source gNB provides the RRC configuration to the UE in the Handover Command. The Handover Command message includes at least cell ID and all information required to access the target cell so that the UE can access the target cell without reading system information. For some cases, the information required for contention based and contention free random access can be included in the Handover Command message. The access information to the target cell may include beam specific information, if any.

4. The UE moves the RRC connection to the target gNB and replies the Handover Complete.

The handover mechanism triggered by RRC requires the UE at least to reset the Medium Access Control (MAC) entity and re-establish RLC. For Data Radio Bearers (DRBs) using RLC Acknowledged Mode (AM) mode, Packet Data Convergence Protocol (PDCP) can either be re-established together with a security key change or initiate a data recovery procedure without a key change. For DRBs using RLC Acknowledged Mode (UM) mode and for SRBs, PDCP can either be re-established together with a security key change or remain as it is without a key change.

Data forwarding, in-sequence delivery and duplication avoidance at handover can be guaranteed when the target gNB uses the same DRB configuration and QoS flow to DRB mapping as the source gNB.

Beam Level Mobility does not require explicit RRC signalling to be triggered—it is dealt with at lower layers—and RRC is not required to know which beam is being used at a given point in time.

Beam level mobility is achieved by what is often called beam management procedures. It has been agreed in RAN1 that the primary Reference Signal (RS) to be used for beam management is Channel State Information (CSI)-RS, which can be configured via dedicated signalling.

CSI-RS Configuration in LTE and Usage of the MAC Control Element (CE) Activation/Deactivation In LTE, until Release 13, all reference signals that UE uses for CSI calculation, CRS, CSI-RS, were non-precoded such that UE is able to measure the raw channel and calculated feedback including preferred precoding matrix based on that. As the number of Tx antennas increases, the amount of feedback becomes larger. In LTE Release 10, when support for 8Tx closed loop precoding was introduced, a double codebook approach was introduced where UE first selects a wideband coarse precoder and then per sub-band a second codeword.

Another possible approach is that a network node such as the eNB beamforms the reference signal and UE calculates feedback on top of that. This approach was adopted in LTE Release 13 and one option for the Full-Dimension (FD)-MIMO as described in the next section.

Release 13 FD-MIMO specification in LTE supports an enhanced CSI-RS reporting called Class B for beamformed CSI-RS. Therein, an LTE RRC_CONNECTED UE may be configured with K CSI-RS resources (where 8>K>1) where it may be 1,2,4 or 8 ports for each CSI-RS resource. Each CSI-RS resource is associated with a CSI-RS Resource Indicator (CRI). The UE reports CRI to indicate the preferred CSI-RS resource, along with the RI/CQI/PMI based on legacy codebook (i.e. Rel-12).

For Release-14 enhanced Full-Dimension (eFD)-MIMO aperiodic CSI-RS was introduced with two different sub-flavors. The CSI-RS resources are configured for the UE as in LTE Release 13 and if the set of K CSI-RS resources is configured to work as aperiodic, aperiodic-aperiodic or multi shot-aperiodic. UE waits for MAC CE activation for N out of K CSI-RS resources. For aperiodic-aperiodic, UE waits in addition to MAC CE, a DCI activation of the CSI-RS resource before reporting.

Activation/deactivation command is specified in 3GPP TS36.321 where Section 5.19 describes:

The network may activate and deactivate the configured CSI-RS resources of a serving cell by sending to the UE the Activation/Deactivation of CSI-RS resources MAC control element described in sub clause 6.1.3.14. The configured CSI-RS resources are initially deactivated upon configuration and after a handover. In FIG. 6, the eNB sends Beamformed CSI-RS 1, 2 and 3. The UE measures these CSI-RS 1, 2 and 3 and since beam CSI RS 2 gives the best result, the UE reports that CRI=2 and RI/CQI/PMI that is measured on CSI-RS 2.

Section 6.1.3.14 in TS 36.321 describes:

The Activation/Deactivation of CSI-RS resources MAC control element is identified by a MAC Protocol Data Unit (PDU) subheader with Logical Channel Identifier (LCID) as specified in table 6.2.1-1. It has variable size as the number of configured CSI process (N) and is defined in FIG. 6.1.3.14-1. Activation/Deactivation CSI-RS command is defined in FIG. 6.1.3.14-2 and activates or deactivates CSI-RS resources for a CSI process.

Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

Ri: this field indicates the activation/deactivation status of the CSI-RS resources associated with CSI-RS-ConfigNZPId i for the CSI-RS process. The Ri field is set to "1" to indicate that CSI-RS resource associated with CSI-RS-ConfigNZPId i for the CSI-RS process shall be activated. The Ri field is set to "0" to indicate that the CSI-RS-ConfigNZPId i shall be deactivated. ConfigNZPId means configuration Non Zero Power Identifier. FIG. 6.1.3.14-1 is shown in FIG. 7 and depicts activation/Deactivation of CSI-RS resources MAC Control Element. FIG. 6.1.3.14-2 is shown in FIG. 8 and depicts activation/Deactivation CSI-RS command.

The MAC CE activation was introduced in LTE to be able to configure more CSI-RS resources for a UE that the UE is able to support feedback for as the MAC CE would selective activate up to max CSI-RS resources supported. Then, without the need to reconfigure by RRC, network may activate another set among the resources configured for the UE.

Radio Link Monitoring (RLM) in LTE and Potential Differences in NR

The purpose of the RLM function in the UE is to monitor the downlink radio link quality of the serving cell in RRC_CONNECTED state and is in LTE based on the Cell-Specific Reference Signals (CRS), which is always associated to a given LTE cell and derived from the Physical Cell Identifier (PCI). This in turn enables the UE when in RRC_CONNECTED state to determine whether it is in-synchronization (sync) or out-of-sync with respect to its serving cell.

The UE's estimate of the downlink radio link quality is compared with out-of-sync and in-sync thresholds, Qout and Qin respectively, for the purpose of RLM. These thresholds are expressed in terms of the Block Error Rate (BLER) of a hypothetical Physical Downlink Control Channel (PDCCH) transmission from the serving cell. Specifically, Qout corresponds to a 10% BLER while Qin corresponds to a 2% BLER. The same threshold levels are applicable with and without Discontinuous Reception (DRX).

The mapping between the CRS based downlink quality and the hypothetical PDCCH BLER is up to the UE implementation. However, the performance is verified by conformance tests defined for various environments. Also the UE may calculate the downlink quality based on the CRS received over the whole band since UE does not necessarily know where PDCCH is going to be scheduled.

FIG. 9 depicts how PDCCH may be scheduled anywhere over the whole downlink transmission bandwidth.

When no DRX is configured, out-of-sync occurs when the downlink radio link quality estimated over the last 200 ms period becomes worse than the threshold Qout. Similarly, without DRX the in-sync occurs when the downlink radio link quality estimated over the last 100 ms period becomes better than the threshold Qin. Upon detection of out-of-sync, the UE initiates the evaluation of in-sync. The occurrences of out-of-sync and in-sync are reported internally by the UE's physical layer to its higher layers, which in turn may apply layer 3 (i.e. higher layer) filtering for the evaluation of Radio Link Failure (RLF). FIG. 10 depicts Higher layer RLM procedures in LTE.

When DRX is in use, in order to enable sufficient UE power saving the out-of-sync and in-sync evaluation periods are extended and depend upon the configured DRX cycle length. The UE starts in-sync evaluation whenever out-of-sync occurs. Therefore, the same period, also referred to as TEvaluate_Qout_DRX, is used for the evaluation of out-of-sync and in-sync. However, upon starting an RLF timer, referred to as T310, until its expiry, the in-sync evaluation period is shortened to 100 ms, which is the same as without DRX. If the timer T310 is stopped due to N311 consecutive in-sync indications, the UE performs in-sync evaluation according to the DRX based period (TEvaluate_Qout_DRX). N311 is referred to as the in-sync counter.

The whole methodology used for RLM in LTE, i.e. measuring the CRS to "estimate" the PDCCH quality, relies on the fact that the UE is connected to an LTE cell which is the single connectivity entity transmitting PDCCH and CRSs.

Beam Recovery

In NR, a procedure called beam recovery is being defined. In beam recovery, an RRC_CONNECTED UE would perform measurements associated to the quality of the serving link and, if that quality goes below a given threshold, the UE would perform beam recovery. The procedure aims to solve the situation where the TX and RX beams of the gNodeB and the UE have become misaligned, but where there are additional beams that could be used to maintain the connection between the gNodeB and the UE.

The beam failure recovery procedure includes the following aspects:

Beam failure detection: here the UE monitors a certain periodic reference signal (RS) to estimate the quality of the serving link. Once the quality of that link falls below a certain threshold, the UE initiates beam recovery.

New candidate beam identification. Once beam failure has been detected, the UE tries to identify a new beam that would provide adequate quality. The UE then searches for a specific RS, which is transmitted from the same node, but in difference candidate beams. During this search procedure, the UE may also change its RX beam.

Beam failure recovery request transmission. Once a new candidate beam has been found, the UE transmits an UL signal using certain UL resources. The gNodeB is prepared to receive the UL signal in these UL resources, and can determine which candidate beam the UE selected based on the receive UL signal.

When the gNodeB has received the beam failure recovery request, it sends a DL response to indicate to the UE that it received the request, using the knowledge of the new beam.

UE monitors gNB response for beam failure recovery request. Once the UE has successfully received the response, the beam recovery is complete.

In NR, a few options are being discussed with respect to the periodic RS the UE monitors to estimate the quality of the serving link:

The network can configure the UE to perform beam monitoring based on signals transmitted in the SS Block.

The network may also configure the UE to perform beam monitoring based on the channel state information reference signal (CSI-RS)

The same options are being discussed as the reference signal used for candidate beam identification. At least for CSI-RS, different configurations may be used for the two purposes.

One candidate for the UL signal used for the beam failure recovery request is physical random access channel (PRACH), the same type of signal used during initial access. To transmit using the PRACH, the UE selects one sequence out of the available PRACH sequences. Hence, the PRACH does not carry any payload. The information is conveyed by choosing different preambles. During initial access, the UE randomly chooses one PRACH sequence from a large set of available PRACH sequences. In other cases, e.g., during handover, the UE may choose a PRACH sequence from a set with only one element.

The beam recovery procedure is somewhat similar to the RLF and RRC reestablishment procedures. The main difference is that beam recovery is a faster procedure. Also, the connection is reestablished with the serving cell: the UE will not search for other cells.

Through beam recovery, the UE can quickly reconnect with the serving cell.

SUMMARY

An object of embodiments herein is therefore to improve the performance of a radio communications network using beams.

According to a first aspect of embodiments herein, the object is achieved by a method performed by a User Equipment (UE) for monitoring a beam transmitted by a base station in a radio communications network. The base station is serving the UE. The UE monitors a reference signal related to the beam, from the base station. Each time a quality of the reference signal is below a first threshold, the UE generates an Out-Of-Synchronization (OOS) event When the number of OOS events reaches an OOS Beam Failure Detection (BFD) threshold, the UE triggers a beam recovery preparation procedure, and when the number of OOS events reaches an OOS Radio Link Monitoring (RLM), threshold, the UE starts an RLF timer.

According to a second aspect of embodiments herein, the object is achieved by a method performed by a base station for configuring a UE to monitor a beam transmitted by the base station in a radio communications network. The base station is serving the UE. The base station configures the UE to:

monitor a reference signal related to the beam, from the base station, each time a quality of the reference signal is below a first threshold, generate an Out-Of-Synchronization, OOS, event, when the number of OOS events reaches an OOS Beam Failure Detection, BFD, threshold, trigger a beam recovery preparation procedure, and when the number of OOS events reaches an OOS Radio Link Monitoring, RLM, threshold, start an RLF timer.

According to a third aspect of embodiments herein, the object is achieved by a User Equipment, UE, for monitoring a beam transmitted by a base station in a radio communications network. The base station is serving the UE. The UE is configured to:

monitor a reference signal related to the beam, from the base station, each time a quality of the reference signal is below a first threshold, generate an Out-Of-Synchronization, OOS, event, when the number of OOS events reaches an OOS Beam Failure Detection, BFD, threshold, trigger a beam recovery preparation procedure, and when the number of OOS events reaches an OOS Radio Link Monitoring, RLM, threshold, start an RLF timer.

According to a fourth aspect of embodiments herein, the object is achieved by a base station for configuring a UE to monitor a beam transmitted by the base station in a radio communications network. The base station is serving the UE. The base station is adapted to configure a UE to:

monitor a reference signal related to the beam, from the base station, each time a quality of the reference signal is below a first threshold, generate an Out-Of-Synchronization, OOS, event, when the number of OOS events reaches an OOS Beam Failure Detection, BFD, threshold, trigger a beam recovery preparation procedure, when the number of OOS events reaches an OOS Radio Link Monitoring, RLM, threshold, start an RLF timer.

An advantage of embodiments herein is that they provide a measurement framework for beam failure detection and radio link monitoring which simplifies the UE monitoring actions, which in turn may simplify UE implementation, the amount of network configuration and the amount of measurements to be performed by the UE which improve the performance of a radio communications network using beams. This may further.e.g. lead to reduce the battery consumption in the UE.

BRIEF DESCRIPTION OF THE DRAWINGS

Examples of embodiments herein are described in more detail with reference to attached drawings in which.

DETAILED DESCRIPTION

Figure 1:
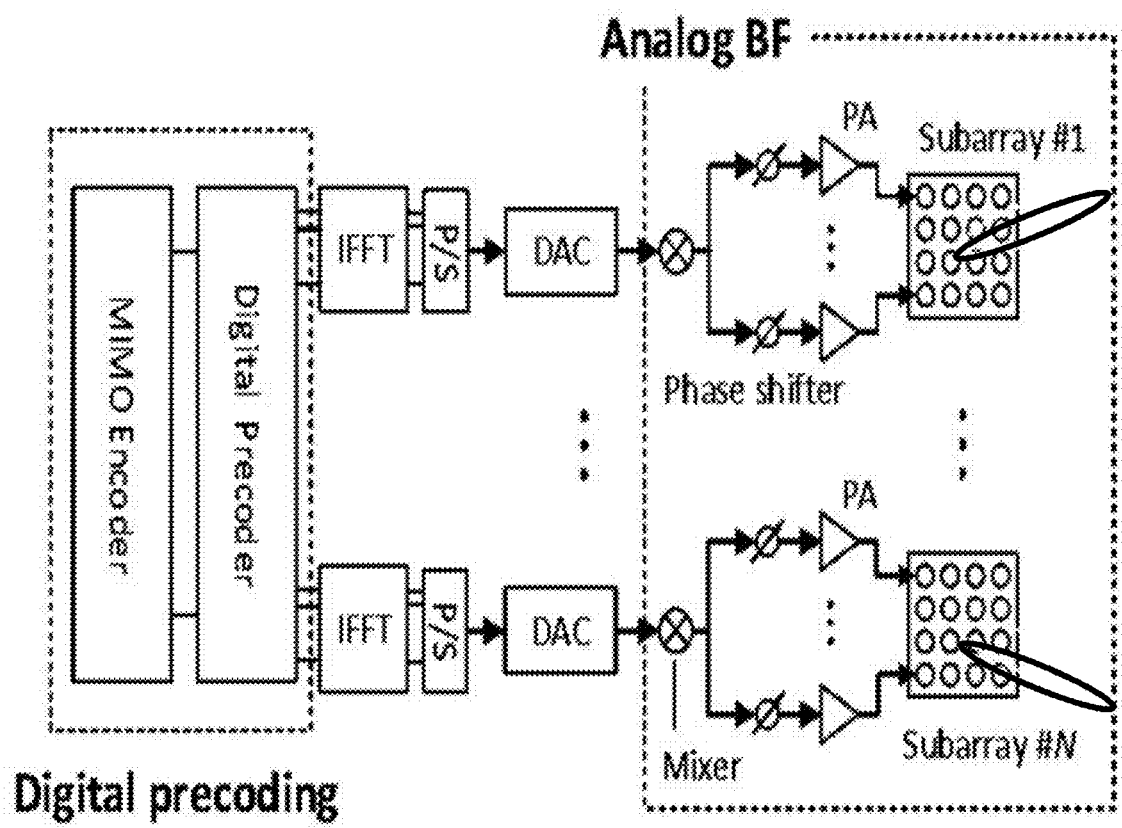
FIG. 1 is a schematic block diagram according to prior art.
Figure 2:
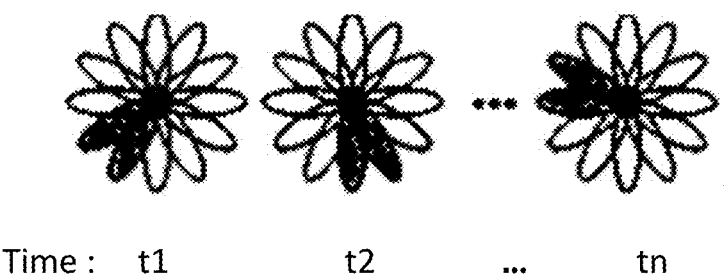
FIG. 2 is a schematic diagram according to prior art.
Figure 3:
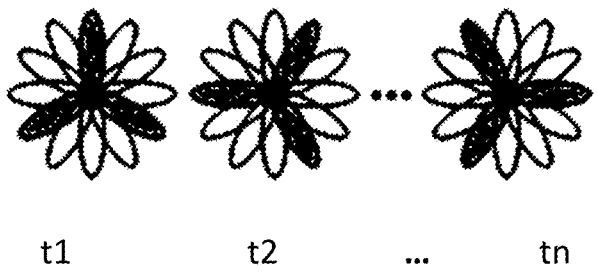
FIG. 3 is a schematic diagram according to prior art.
Figure 4:
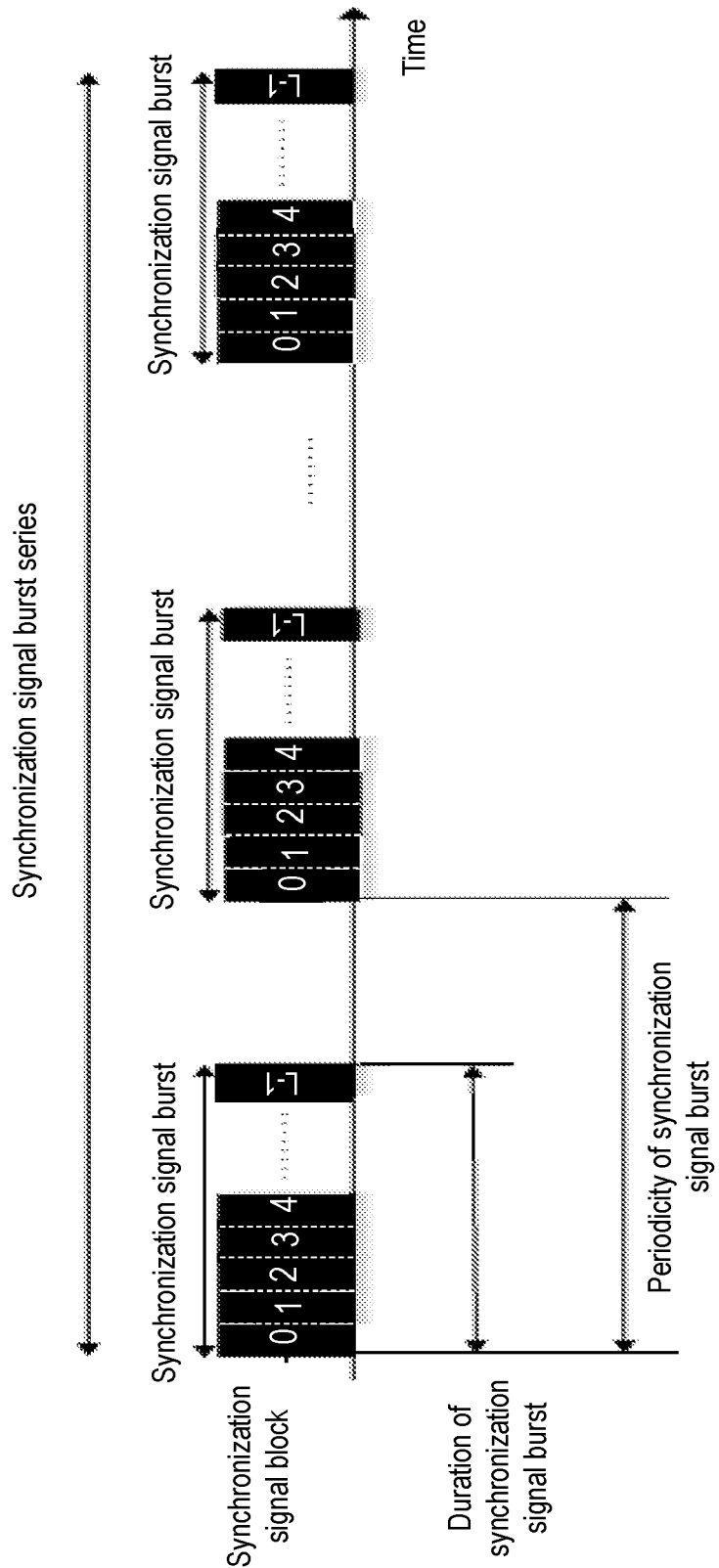
FIG. 4 is a schematic block diagram according to prior art.
Figure 5:
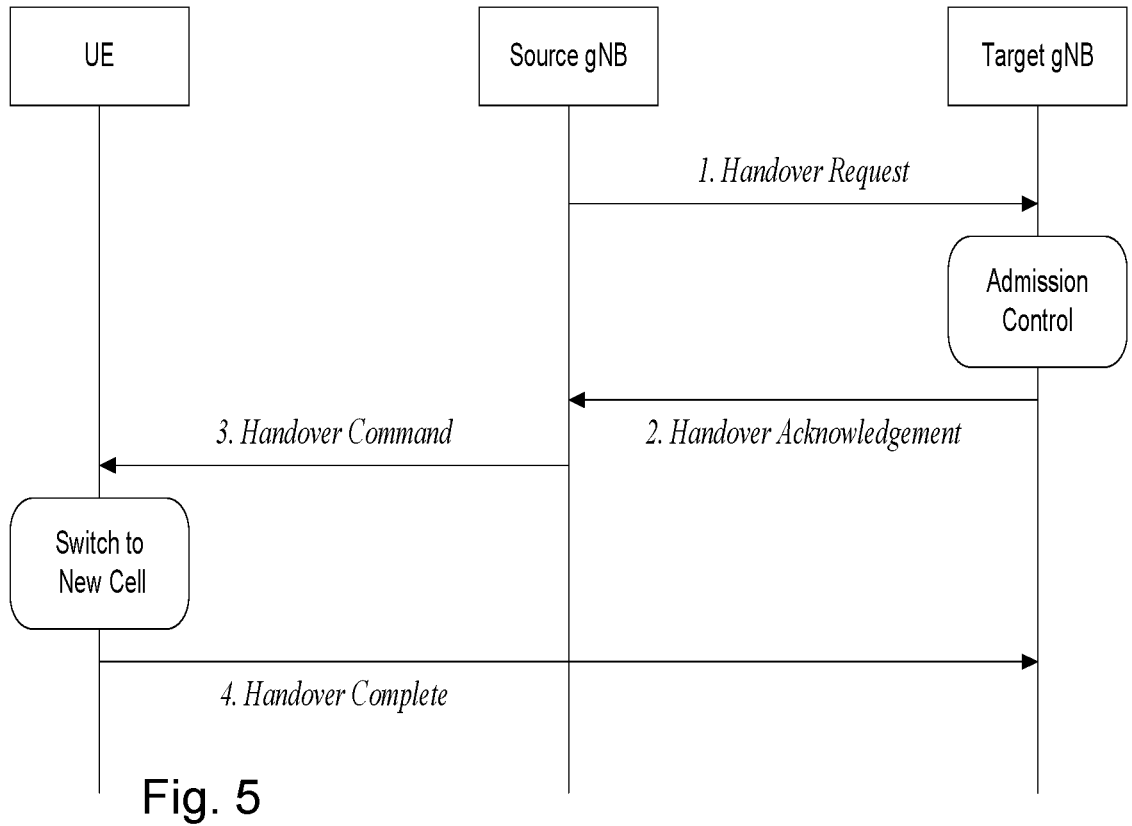
FIG. 5 is a sequence diagram illustrating a method according to according to prior art.
Figure 6:
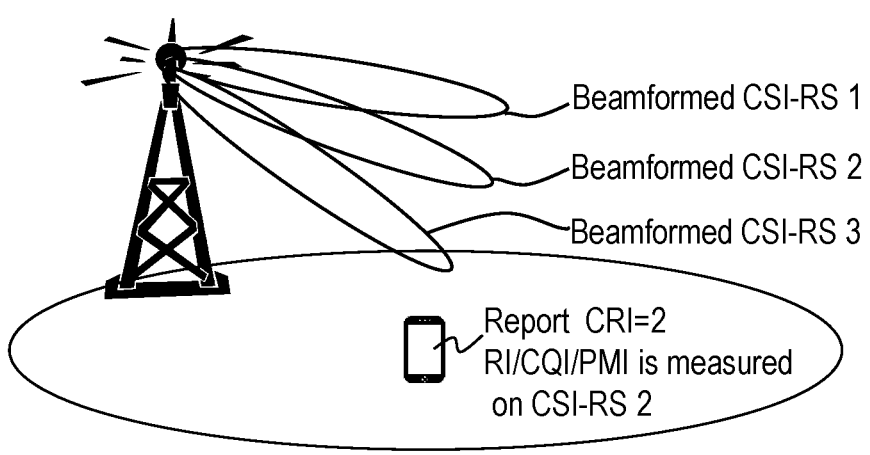
FIG. 6 is a schematic block diagram according to prior art.
Figure 7:
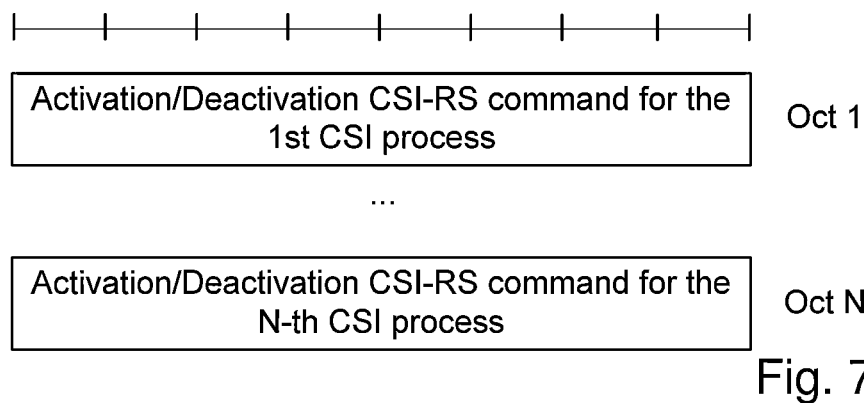
FIG. 7 is a schematic block diagram according to prior art.
Figure 8:
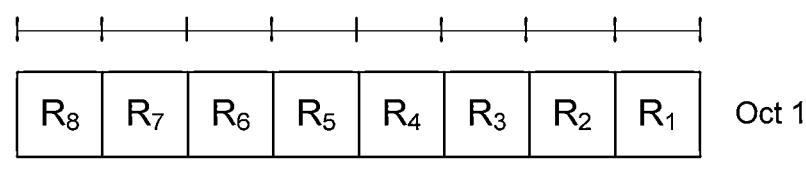
FIG. 8 is a schematic block diagram according to prior art.
Figure 9:
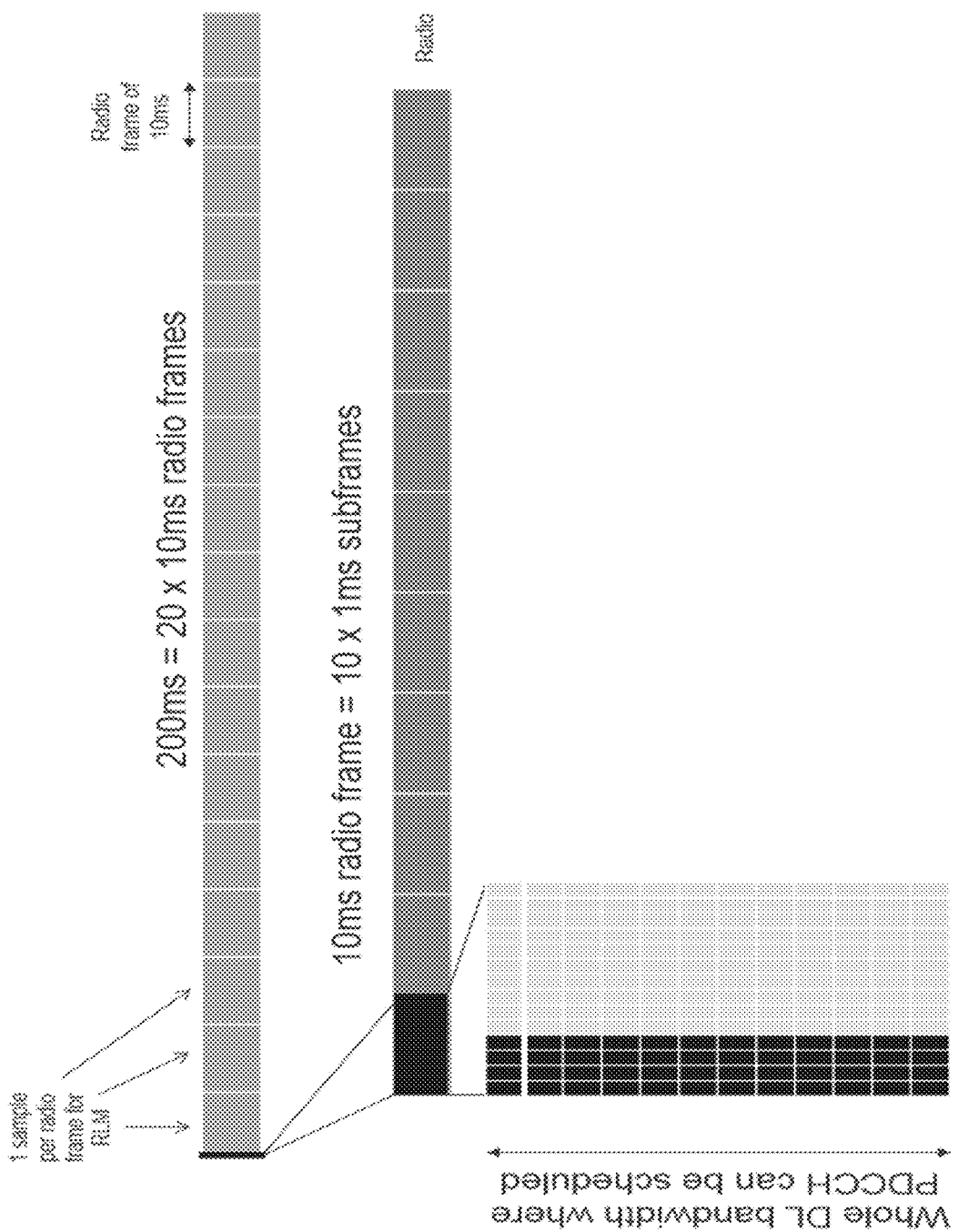
FIG. 9 is a schematic block diagram according to prior art.
Figure 10:
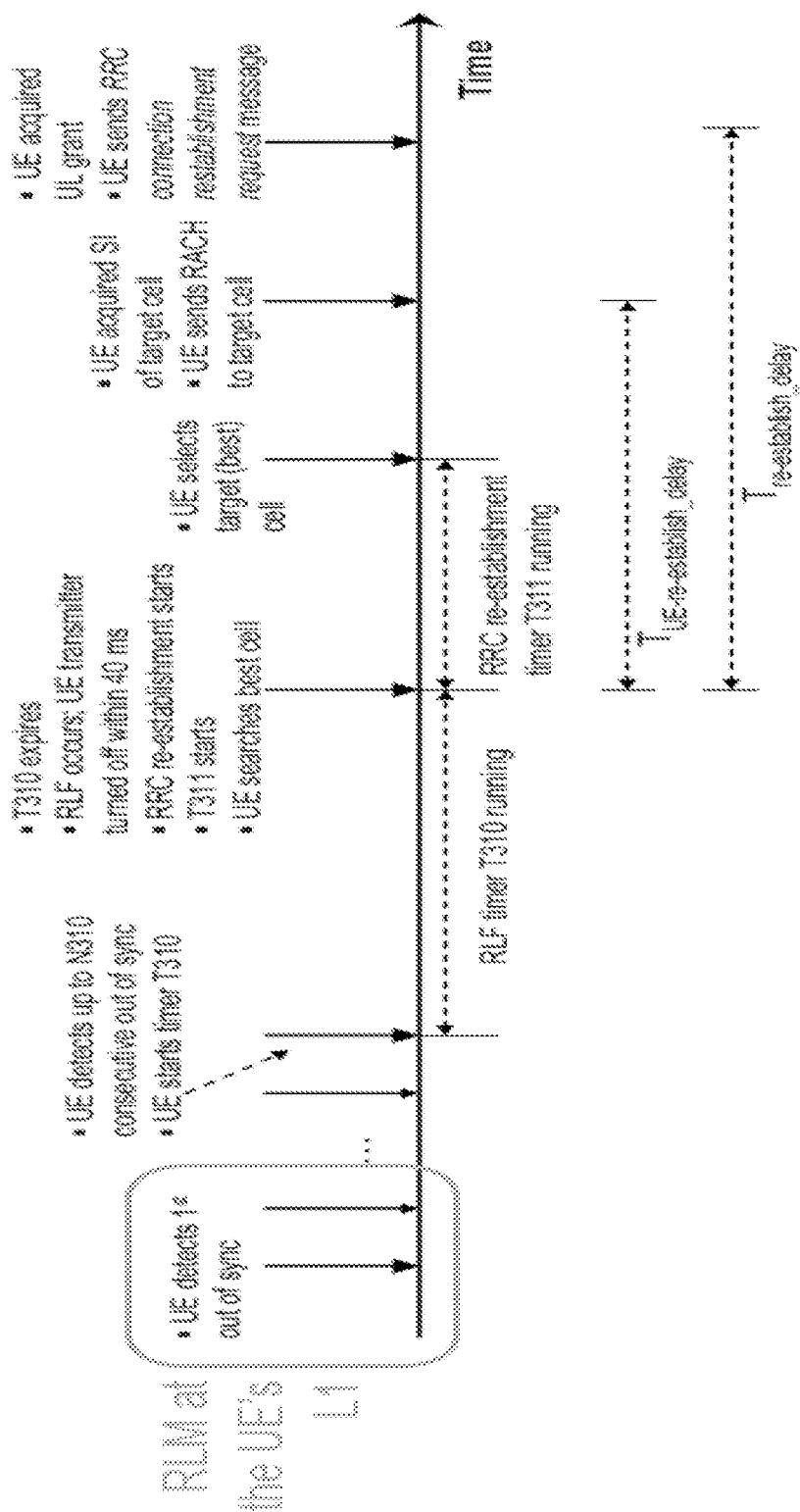
FIG. 10 is a schematic block diagram according to prior art.

As a part of developing embodiments herein a problem will first be identified and discussed.

Beam recovery has been discussed for the new 5G radio (NR) as a way to enable the UE to detect a downlink problem in the serving cell and trigger an action to indicate the network that the DL beam the network might assume as the best (i.e. the DL beam the network would have used for PDCCH transmission to contact the UE e.g. to schedule data or control information) is either not good enough any longer or not the best any longer. Concerning that beam recovery procedure, the following has been agreed in RAN1 #88, in 3GPP TS 38.213, section 6.

Agreements:
UE Beam failure recovery mechanism includes the following aspects
 Beam failure detection
 New candidate beam identification
 Beam failure recovery request transmission
 UE monitors gNB response for beam failure recovery request
Beam failure detection
 UE monitors beam failure detection RS to assess if a beam failure trigger condition has been met
 Beam failure detection RS at least includes periodic CSI-RS for beam management
 SS-block within the serving cell can be considered, if SS-block is also used in beam management as well
 For Further Study (FFS): Trigger condition for declaring beam failure
New candidate beam identification
 UE monitors beam identification RS to find a new candidate beam
 Beam identification RS includes
Periodic CSI-RS for beam management, if it is configured by NW
Periodic CSI-RS and SS-blocks within the serving cell, if SS-block is also used in beam management as well
Beam failure recovery request transmission
 Information carried by beam failure recovery request includes at least one followings
Explicit/implicit information about identifying UE and new gNB TX beam information
Explicit/implicit information about identifying UE and whether or not new candidate beam exists
FFS:
Information indicating UE beam failure
Additional information, e.g., new beam quality
 Down-selection between the following options for beam failure recovery request transmission
PRACH
PUCCH
PRACH-like (e.g., different parameter for preamble sequence from PRACH)
 Beam failure recovery request resource/signal may be additionally used for scheduling request
UE monitors a control channel search space to receive gNB response for beam failure recovery request
 FFS: the control channel search space can be same or different from the current control channel search space associated with serving BPLs
 FFS: UE further reaction if gNB does not receive beam failure recovery request transmission
There are a certain number of problems to be solved that were not discussed in RAN1 or RAN2 such as:

Some embodiments herein address these issues and provides a set of methods for each of these.

As mentioned above, an object of embodiments herein is therefore to improve the performance of a radio communications network using beams.

Some embodiments herein relate to Beam recovery procedures.

Embodiments herein comprise a set of method executed by a UE and a network such as a base station, comprising a set of network configurations and UE actions enabling the UE to monitor a possible failure of a beam in a serving cell. This may according to example embodiments herein mean that the UE estimates that the network is not able to efficiently reach the UE with PDCCH or any other downlink control channel; triggers UE actions to notify the network what could be a new beam to be used in the downlink for PDCCH; trigger the network to transmit a notification to the UE concerning whether beam recovery was successful or not and what needs to be updated at the UE based on the newly selected beam, e.g. beam management related configuration; UE actions upon that network response; network actions concerning how the UE could be reached before and after beam recovery is notified.

Figure 11:
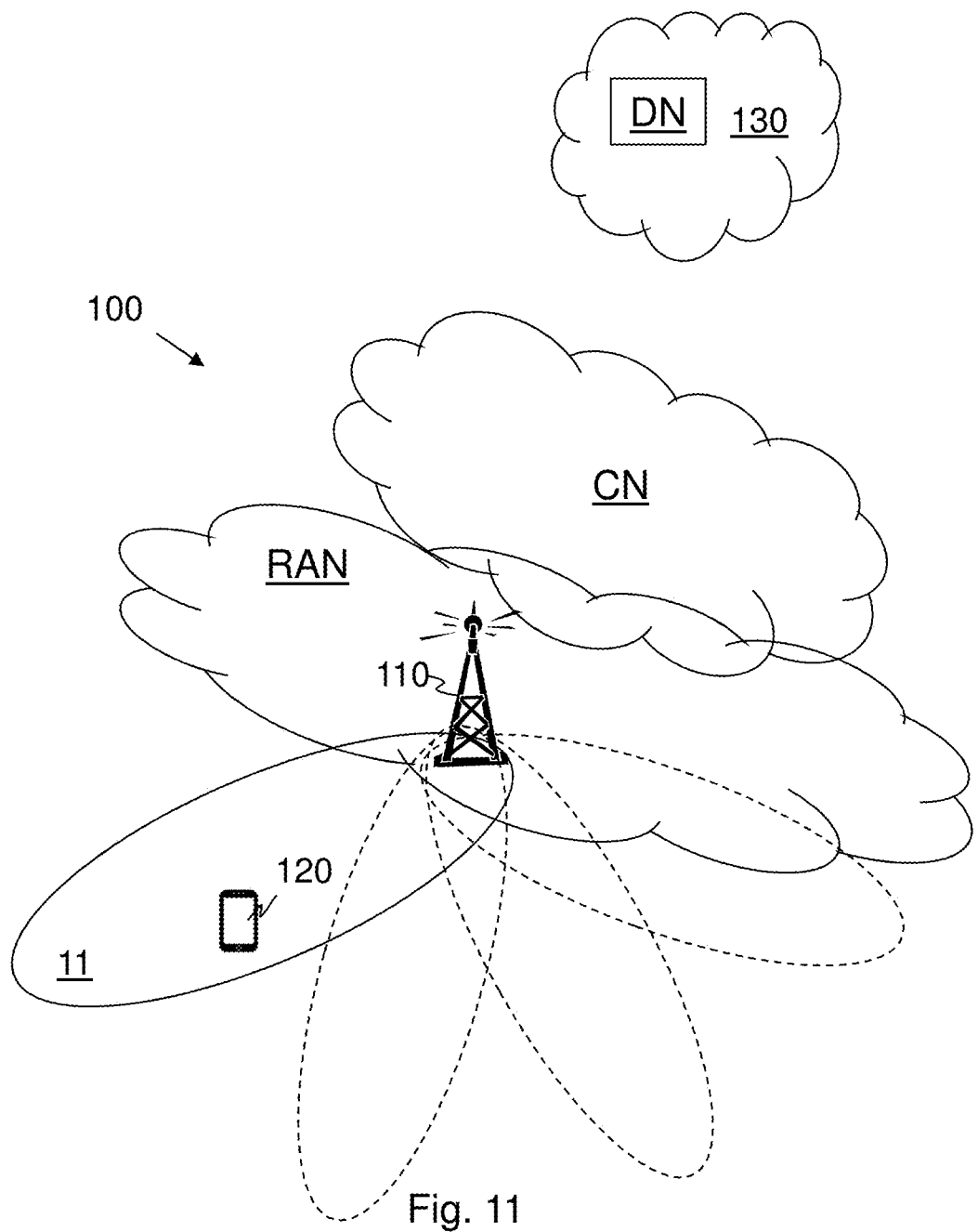
FIG. 11 is a schematic block diagram depicting embodiments of a radio communications network.

Embodiments herein relate to wireless communication networks in general. FIG. 11 is a schematic overview depicting a radio communications network 100. The radio communications network 100 comprises one or more RANs and one or more CNs. The radio communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/ enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. a UE 120 such as a mobile station, a non-access point (non-AP) STA, a STA, and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The radio communications network 100 comprises a base station 110 providing radio coverage over a geographical area, a service area 11, which may also be referred to as a beam or a beam group of a first radio access technology (RAT), such as 5G, LTE, Wi-Fi or similar. The base station 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a 5G NodeB (gNB, gNodeB), a base transceiver station, a radio remote unit, an Access Point Base Station, a base station router, a transmission arrangement of a radio base station, a stand-alone access point or any other network unit capable of communicating with a wireless device within the service area served by the base station 110 depending e.g. on the first radio access technology and terminology used. The base station 110 may be referred to as a serving radio network node and communicates with the UE 120 with Downlink (DL) transmissions to the UE 120 and Uplink (UL) transmissions from the UE 120.

Methods for configuring the UE 120 to monitor a beam transmitted the base station 110 in the radio communications network 100, is performed by the base station 110. As an alternative, a Distributed Node (DN) and functionality, e.g. comprised in a cloud 130 as shown in FIG. 11, may be used for performing or partly performing the methods.

Figure 12A:
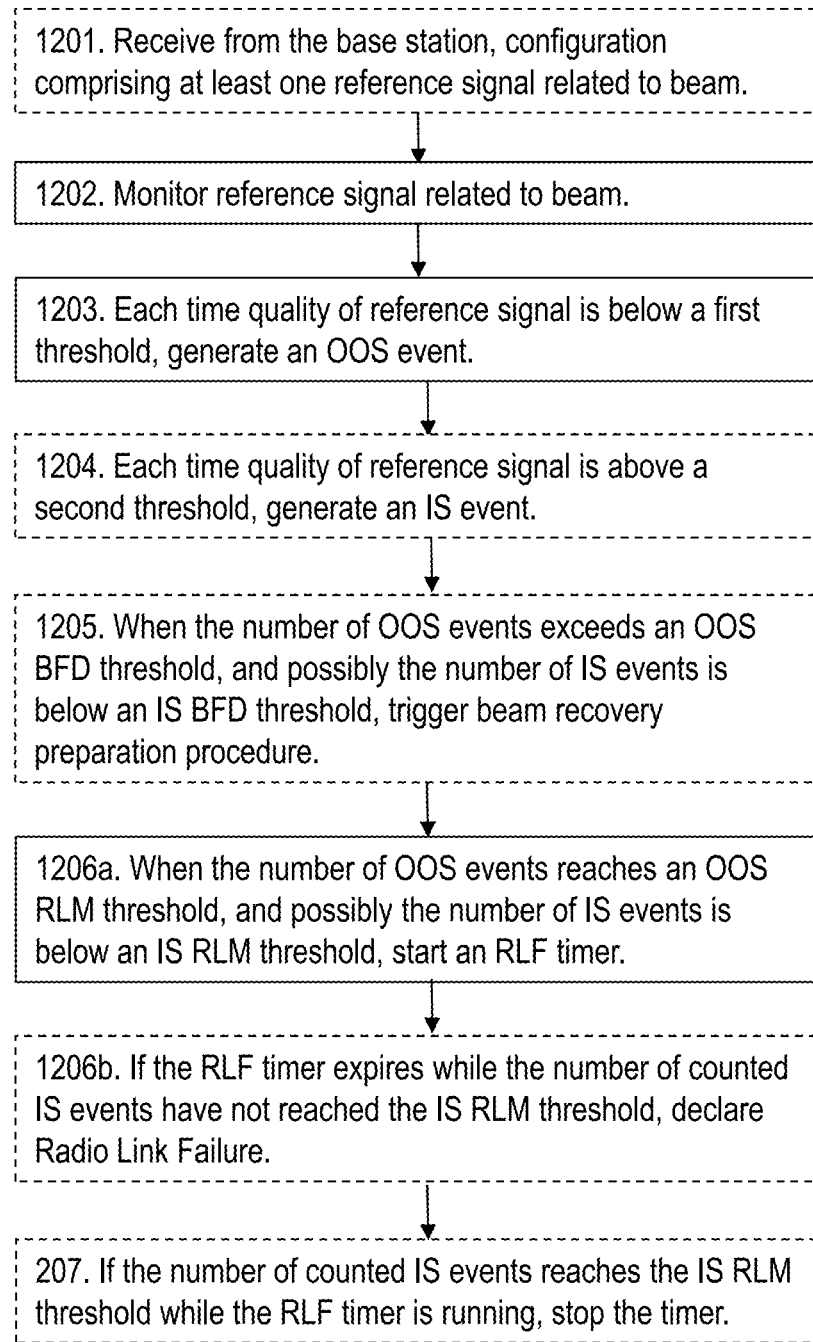
FIG. 12*a* is a flowchart illustrating embodiments of method in a UE.

Example embodiments of a flowchart depicting embodiments of a method performed by the UE 120, for monitoring a beam transmitted by the base station 110 in the radio communications network 100 is depicted in FIG. 12a. The base station 110 is serving the UE 120. The method will first be described in a general way, which will be explained with more details and examples later on. The method comprises one or more of the following actions which actions may be taken in any suitable order. Actions that are optional are presented in dashed boxes in FIG. 12a.

Action 1201

This action is optional. The UE 120 may first be configured e.g. by receiving a configuration from the network such as the base station 110. Thus, in some embodiments, the UE 120 receives a configuration from the base station 110. The configuration comprises at least one reference signal related to the beam. The reference signal is to be monitored by the UE 120 for Beam Failure Detection (BFD), and cell-level Radio Link Monitoring (RLM).

Action 1202

The UE 120 monitors a reference signal related to the beam. The beam is sent from the base station 110. As mentioned above, the reference signal is to be monitored by the UE 120 for BFD and for cell-level RLM.

Action 1203

To be able to detect a beam failure, the UE 120 should generate Out-Of-Synchronization (OOS) events based the quality of the reference signal such as measured CSI-RS. Thus, each time a quality of the reference signal is below a first threshold, also referred to as Thr-oos, the UE 120 generates an OOS event.

Action 1204

This action is optional. To detect some kind of recovery, the UE 120 may generate IS events based the quality of the reference signal such as measured CSI-RS.

Each time a quality of the reference signal is above a second threshold, also referred to as Thr-is, the UE 120 may in some embodiments, generate an In-Synchronization (IS) event.

Action 1205

When the number of OOS events reaches an OOS BFD threshold also referred to as N-oos-bfd, the UE 120 triggers a beam recovery preparation procedure. Once the UE 120 has detected N-oos-bfd OOS indications, the UE 120 may determine that there is a problem with the current beam, and starting the preparation to recover the beam.

In some embodiments, the triggering of the beam recovery preparation procedure is performed when furthermore, the number of IS events is below an IS BFD threshold also referred to as N-is-bfd. Since the UE 120 has detected less N-is-bfd IS indications, the UE 120 may determine that there is a problem with the current beam, and starting the preparation to recover the beam.

Action 1206a

When the number of OOS events reaches an OOS RLM threshold also referred to as N-oos-rlm, the UE 120 starts an RLF timer also referred to as Timer-oos-rlm.

In some embodiments, the starting OF the RLF timer is performed when furthermore, the number of IS events is below an IS RLM threshold also referred to as N-is-rim.

In some embodiments, the starting of the RLF timer further comprises starting to count IS events. This may be used in some embodiments to decide whether to declare RLF or just stop the timer.

Action 1206b

This is optional alternative. If the RLF timer expires while the number of counted IS events have not reached the IS RLM threshold the UE 120 may declare RLF.

Action 1207

This is optional alternative. If the number of counted IS events reaches the IS RLM threshold while the RLF timer is running the UE 120 may stop the RLF timer.

The OOS RLM threshold and the OOS BFD threshold may be configured such that the beam recovery preparation procedure is triggered before declaring Radio Link Failure. Further, the IS RLM threshold and the IS BFD threshold may be configured such that the beam recovery preparation procedure is triggered before declaring Radio Link Failure.

Figure 12B:
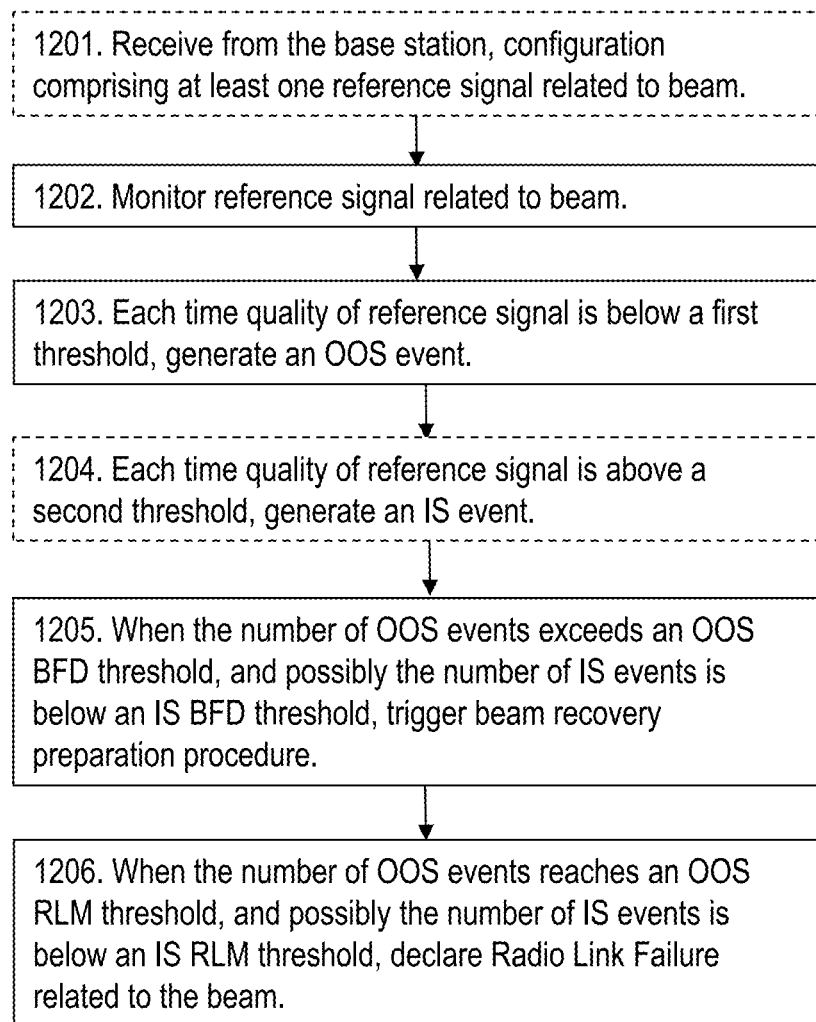
FIG. 12*b* is a flowchart illustrating embodiments of method in a UE.

Example embodiments of a flowchart depicting embodiments of a method performed by the UE 120, e.g. for monitoring a beam transmitted by the base station 110 in the radio communications network 100 is depicted in FIG. 12*b*. The base station 110 is serving the UE 120. The method comprises one or more of the following actions which actions may be taken in any suitable order:

Monitoring 1202 a reference signal related to the beam, from the base station 110, each time a quality of the reference signal is below a first threshold, generating 1203 an Out-Of-Synchronization, OOS, event, each time a quality of the reference signal is above a second threshold, generating 1204 an In-Synchronization, IS, event, when the number of OOS events reaches an OOS Beam Failure Detection, BFD, threshold, and possibly the number of IS events is below an IS BFD threshold, triggering 1205 a beam recovery preparation procedure, when the number of OOS events reaches an OOS Radio Link Monitoring, RLM, threshold and possibly the number of IS events is below an IS RLM threshold, declaring 1206 Radio Link Failure related to the beam, wherein OOS RLM threshold and the OOS BFD threshold and possibly the wherein IS RLM threshold and the IS BFD threshold are configured such that the beam recovery preparation procedure is triggered before declaring Radio Link Failure.

Figure 13:
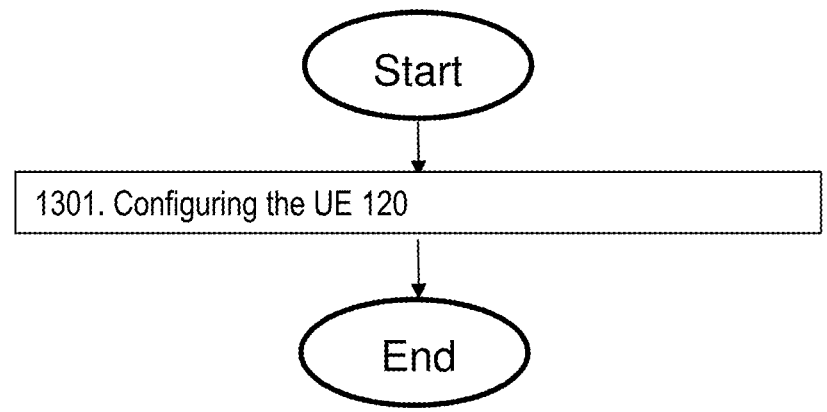
FIG. 13 is a flowchart illustrating embodiments of method in a base station

Example embodiments of a flowchart depicting embodiments of a method performed by the base station 110 for configuring the UE 120 to monitor a beam transmitted the base station 110 in the radio communications network 100, is depicted in FIG. 13. The base station 110 is serving the UE 120. The method comprises one or more of the following actions which actions may be taken in any suitable order.

This method configures the UE 120 to perform the method actions described above.

Action 1301

The base station 110 configures the UE 120 to:

Monitor a reference signal related to the beam from the base station 110.

Each time a quality of the reference signal is below a first threshold, generate an OOS event.

When the number of OOS events reaches an OOS BFD threshold, trigger a beam recovery preparation procedure, and when the number of OOS events reaches an OOS RLM threshold, start an RLF timer.

In some embodiments, the base station 110 further configure the UE 120 to, each time a quality of the reference signal is above a second threshold, generate an IS event.

In some of these embodiments, the base station 110 further configures the UE 120 to trigger the beam recovery preparation procedure to be performed when furthermore, the number of IS events is below an IS BFD threshold.

The base station 110 may configure the UE 120 to start the RLF timer when furthermore, the number of IS events is below an IS RLM threshold.

In some embodiments, the base station 110 configures the UE 120 to start to count IS events when starting the RLF timer and to act according to:

If the RLF timer expires while the number of counted IS events have not reached the IS RLM threshold, declaring Radio Link Failure, and if the number of counted IS events reaches the IS RLM threshold while the RLF timer is running, stop the timer.

The OOS RLM threshold and the OOS BFD threshold may be configured such that the beam recovery preparation procedure is triggered before declaring Radio Link Failure.

Further, the IS RLM threshold and the IS BFD threshold may be configured such that the beam recovery preparation procedure is triggered before declaring Radio Link Failure.

Further Extensions and Variations

The UE discussed below may refer to the UE 120 and the network discussed below may refer to the base station 110. The example embodiments may be combined in any suitable way.

Example embodiments herein e.g. comprises the following steps from the UE 120 which is referred to as the UE below and the base station 110 which is referred to as the network below:

Part 1, RS Configuration for Beam Failure Detection and Radio Link Monitoring

An RRC_CONNECTED UE may be configured, e.g. via dedicated signaling, with at least one CSI-RS resource to be monitored for cell-level radio link monitoring and beam failure detection. That configuration may comprise one or multiple resources where the particular CSI-RS is transmitted. In that context, a resource may be in the time domain, e.g. one or multiple OFDM symbol(s), the frequency domain and/or sequence domain, e.g. a given seed such as a virtual cell ID. The UE may not need to be aware how that CSI-RS resource maps to a particular beam in the downlink transmitted by the network i.e. the UE simply is configure to monitor the quality of that particular resource.

On the network side, that configured CSI-RS is beamformed similarly to a fallback PDCCH i.e. that is how the network should reach the UE if the network does not have any more granular information such as a narrow beam used for PDSCH transmission. On the network side, the exact configuration for these two purposes, i.e. beam failure detection and radio link monitoring, is decided based on the initial downlink beam knowledge the network may obtain during the random access procedure during state transition from RRC_IDLE to RRC_CONNECTED or after a handover. A UE is in RRC_CONNECTED when an RRC connection has been established. If this is not the case, i.e. no RRC connection is established, the UE is in RRC_IDLE or RRC_INACTIVE state. In other words, after random access, e.g. based on a beam selection using an RS transmitted in the SS Block, the network knows the best DL beam the UE is covered by. There may be two cases depending on network configuration:

If the network is performing beam sweeping of periodic CSI-RS(s) to cover the cell, the network may select one of the already transmitted DL beams based on that input i.e. the network will in fact select a CSI-RS resource transmitting in that direction. By doing that, the network makes sure that the UE will monitor a CSI-RS resource transmitted in a DL beam that is the best according to the UE selection during random access. The network may choose to use that configuration if the cell is loaded and many UEs will require to monitor many beams all over the cell coverage for these purposes.

If the network is NOT performing beam sweeping of periodic CSI-RS(s) to cover the cell, the network has the flexibility to perform beam tracking. In that case, the network may choose any available resource, time, frequency, sequence, to transmit in that selected beam e.g. based on UE input during random access. The network may choose to use that configuration if the cell is not loaded to avoid the sweeping in all directions that may create interference to other cells.

Part 2, Configuration for Triggering Beam Failure Detection and Radio Link Monitoring and UE Monitoring Actions The UE is configured with different criteria to trigger beam failure detection and radio link monitoring, although the same RS configuration may be used for both purposes as long as the UE is within the coverage of a given beam.

To detect a beam failure, the UE should generate out-of-sync (OOS) events based the quality of the measured reference signal, e.g., CSI-RS. To detect some kind of recovery, the UE should generate in-sync (IS) events based the quality of the measured reference signal, e.g., CSI-RS. There may be different ways these events may be generated. An OOS event may, e.g., be generated when the quality of the reference signal is below a certain threshold. An IS event may, e.g., be generated when the quality of the reference signal is above a certain threshold In some embodiments the UE is configured by the network with a threshold Thr-oos where the threshold indicates that if quality of the configured reference signal, e.g., CSI-RS falls below that value the UE should generate an OSS event and start counting them. The threshold Thr-oos is also referred to as the first threshold herein. Similarly, the UE is configured by the network with a threshold Thr-is where the threshold indicates that if the quality of the configured reference signal, e.g., CSI-RS goes above that value the UE should generate an IS event and start counting them. The threshold Thr-is is also referred to as the second threshold herein.

In some other embodiments the UE implementation defines internal thresholds Thr-oos and Thr-is that maps a given PDCCH BLER, e.g. 2%, in pre-defined measured intervals for a given accuracy. The threshold Thr-oos indicates that if quality of the configured reference signal, e.g., CSI-RS falls below that value the UE should generate an OOS event and start counting them. That is an initial indication of beam failure. The threshold Thr-is indicates that if quality of the configured CSI-RS goes above that value the UE should generate an IS event and start counting them.

The UE is also configured with at least some of the following parameters related to the triggering of beam failure detection and radio link failure detection wherein "N" in the parameters below means "number".

- N-oos-bfd: A beam recovery preparation procedure, which will be described later, should be triggered when the number of OOS events reach this value N-oos-bfd. That may be the start of a timer that is initiated and, once expired, the UE may declare beam failure detection.
- Timer-oos-bfd: This timer is started once the number of OOS events reached the value N-oos-bfd. Once that timer starts, the UE should start monitoring the number of in-sync events. There may also be a threshold associated to that, either configurable by the network or defined based on requirements related to the PDCCH quality, such as e.g. a 2% BLER for a given accuracy and measurement intervals. Notice that if network wants to make the UE immediately trigger beam recovery once N-oos-bfd is reached, that timer may be set to zero. Alternatively, another embodiment may consider that the timer does not exist.
- N-is-bfd: After Timer-oos-bfd starts, the UE should keep monitoring the quality of the configured CSI-RS and the occurrence of IS events. If the number of IS events goes above that value, the timer should be stopped and the UE should leave the condition to enter beam recovery procedure. If the timer is set of ZERO, that parameter does not need to be configured. In one embodiment without the parameter Timer-oos-bfd this parameter also does not need to exist.
- N-oos-rlm: N-oos-rlm is similar to N310 in LTE. An RLF timer should be started when the number of OOS events reach that value. When N-oos-bfd is reached, the timer Timer-oos-bfd will start and the number of OOS events will kept being counted. Note that this value may preferably be configured higher than N-oos-bfd. That parameter is equivalent to the N310 parameter in LTE, and the RLF timer is equivalent to T310 in LTE. If N-oos-rlm is reached while the timer Timer-oos-bfd is running, the UE should wait for the timer to finish before RLF is declared. That gives the UE 120 an opportunity to finish its beam recovery attempt(s) within the same cell before RLF is declared.
- Timer-oos-rlm: This timer is started once the number of OOS events reached the value N-oos-rlm. Once the timer starts the UE starts to monitors IS events. Notice that this value should be configured higher > than N-oos-bfd. While that timer is running the UE is still allowed to perform beam recovery procedures within the same cell according to a well-defined behavior. In some embodiments, while that timer is running, the UE should try a maximum number of attempts before stopping for a back-off time and try again. The UE may also use random access power ramp-up actions such as change of Tx beam, etc. A successful attempt may be perceived in the higher layers by incoming IS events as an effect of a beam or beam pair switching from the network side for the configured CSI-RS. When the timer Timer-oos-rlm expires the UE declares RLF.
- N-is-rim: The RLF timer, equivalent to T310 in LTE, should be stopped when the number of IS events reach this value N-is-rlm.

Notice that lower layers might always provide to higher layers at the UE the IS and OOS events. However, while the higher layers are always monitoring the OOS events to possibly trigger Timer-oos-rlm, the IS events are only counter once the timer is triggered.

Part 3, UE Monitoring Actions

Once the UE is configured with the parameters described in Part 2 the UE will monitor the configured reference signal, e.g., CSI-RS and compare its quality with a threshold. If quality is < than Thr-oos the UE should generate OOS events. That event is indicated to the layer responsible for RLM, such as e.g. RRC, and for beam failure detection, such as e.g. MAC, Pysical (PHY) or RRCThe layer at the UE responsible for beam failure detection will monitor whether the number of OOS events reach N-oos-bfd while in parallel, the layer responsible for radio link monitoring will monitor whether the number of OOS events reach N-oos-rlm. Hence, these counters are started once the first OOS event arrives. Notice that keeping two parallel counters is one simplified implementation, while one could keep a single counter but monitor both thresholds e.g. if the same layer (or function at the UE) handles both beam failure detection and RLM procedures.

Actions of the Beam Failure Detection Layer

In one embodiment, when the number of OOS events reaches N-oos-bfd, the UE should declare the detection of beam failure and invoke a beam recovery procedure. This is a quite simple solution.

In another embodiment, when the number of OOS events reaches N-oos-bfd, the UE starts a timer Timer-oos-bfd and starts to count IS events. If the timer expires while the number of counted IS events have not reached N-is-bfd, the UE should declare the detection of beam failure and invoke a beam recovery procedure. If the number of counted IS events reaches N-is-bfd, while the timer is running, the UE should leave that condition and stop the timer. This provides some time to the UE to recover without the need to indicate the network and/or the network to recover based on L1 reporting not triggered by beam failure detection.

Note: The next part (Part 4)) will describe the UE actions upon beam failure detection i.e. beam recovery procedure and network response to that.

Actions of the Radio Link Monitoring Layer

In one embodiment, when the number of OOS events reaches N-oos-rlm the UE starts the timer Timer-oos-rlm and starts to count IS events. If the timer expires while the number of counted IS events have not reached N-is-rlm, the UE should declare RLF. If the number of counted IS events reaches N-is-rlm, while the timer is running, the UE should leave that condition, i.e. having the timer running, and stop the timer. The word "condition when used herein means" having the timer running.

Figure 14:
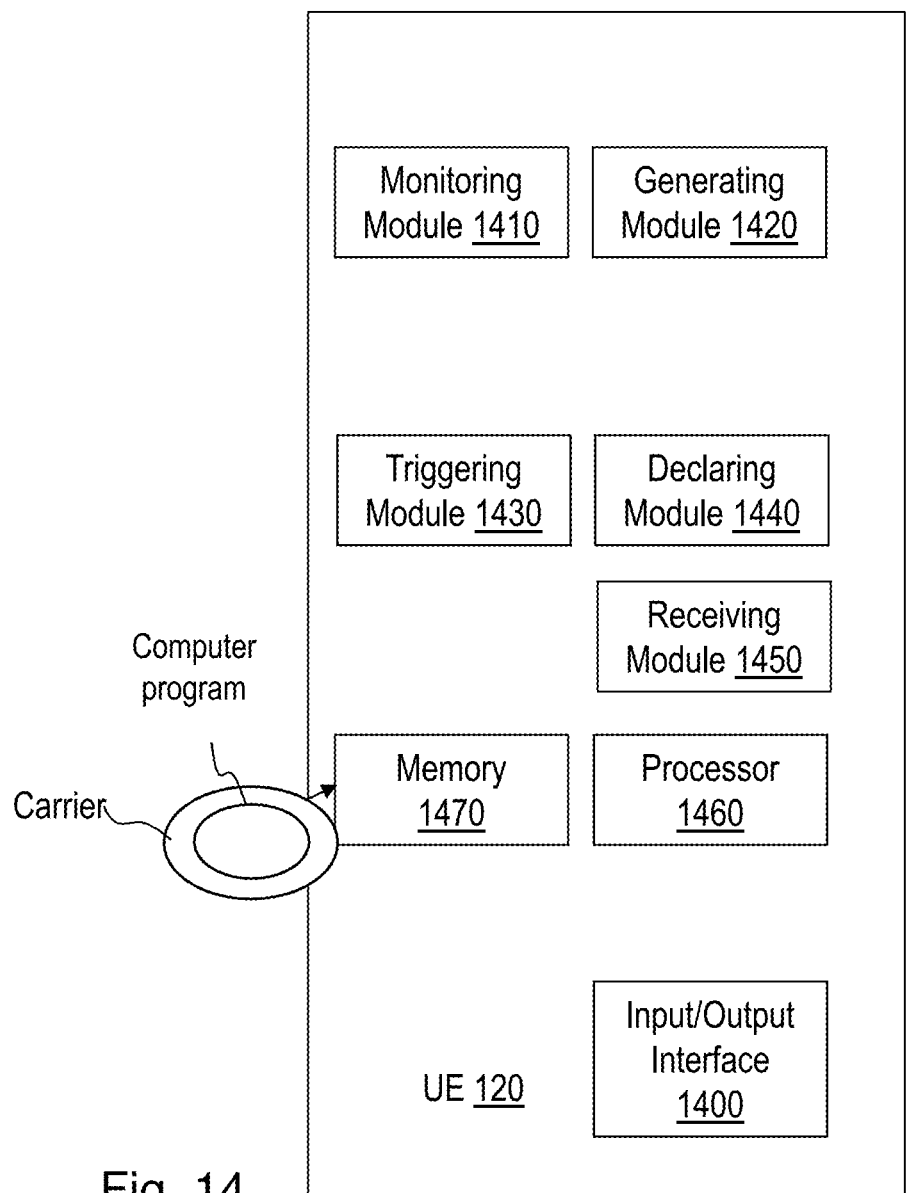
FIG. 14 is a schematic block diagram illustrating embodiments of a UE
FIG. 15. is a schematic block diagram illustrating embodiments of a base station.

To perform the method actions for monitoring a beam transmitted by the base station 110 in the radio communications network 100, the UE 120 may comprise the arrangement depicted in FIG. 14. The UE 120 is adapted to be served by the base station 110.

The UE 120 is configured to, e.g. by means of a monitoring module 1410 in the UE 120, monitor a reference signal related to the beam, from the base station 110.

The UE 120 is configured to, e.g. by means of a generating module 1420 in the UE 120, each time a quality of the reference signal is below a first threshold, generate an OOS event.

The UE 120 is further configured to, e.g. by means of a triggering module 1430 in the UE 120, when the number of OOS events reaches an OOS BFD threshold, trigger a beam recovery preparation procedure.

The UE 120 is further configured to, e.g. by means of the triggering module 1430 in the UE 120, when the number of OOS events reaches an OOS RLM, threshold, start an RLF timer.

The UE 120 may further be configured to, e.g. by means of a receiving module 1450 in the UE 120, receive from the base station 110 a configuration comprising at least one reference signal related to the beam, which reference signal is to be monitored by the UE 120 for BFD, and cell-level RLM.

The UE 120 may further be configured to, e.g. by means of the generating module 1420 in the UE 120, each time a quality of the reference signal is above a second threshold, generate an IS event.

The UE 120 may further be configured to, e.g. by means of the triggering module 1430 in the UE 120, trigger the beam recovery preparation procedure when furthermore, the number of IS events is below an IS BFD threshold.

The UE 120 may further be configured to, e.g. by means of the triggering module 1430 in the UE 120, start the RLF timer when furthermore, the number of IS events is below an IS RLM threshold.

The UE 120 may further be configured to, e.g. by means of the triggering module 1430 in the UE 120, start the RLF timer and to further start to count IS events.

The UE 120 may further be configured to, e.g. by means of the declaring module 1440 in the UE 120, if the RLF timer expires while the number of counted IS events have not reached the IS RLM threshold, declare Radio Link Failure.

The UE 12 may further be configured to, e.g. by means of a processor 1460 in the UE 120, if the number of counted IS events reaches the IS RLM threshold while the RLF timer is running, stop the RLF timer.

The OOS RLM threshold and the OOS BFD threshold may be adapted to be configured such that the beam recovery preparation procedure is triggered before declaring Radio Link Failure.

The IS RLM threshold and the IS BFD threshold may be adapted to be configured such that the beam recovery preparation procedure is triggered before declaring Radio Link Failure.

Figure 15:
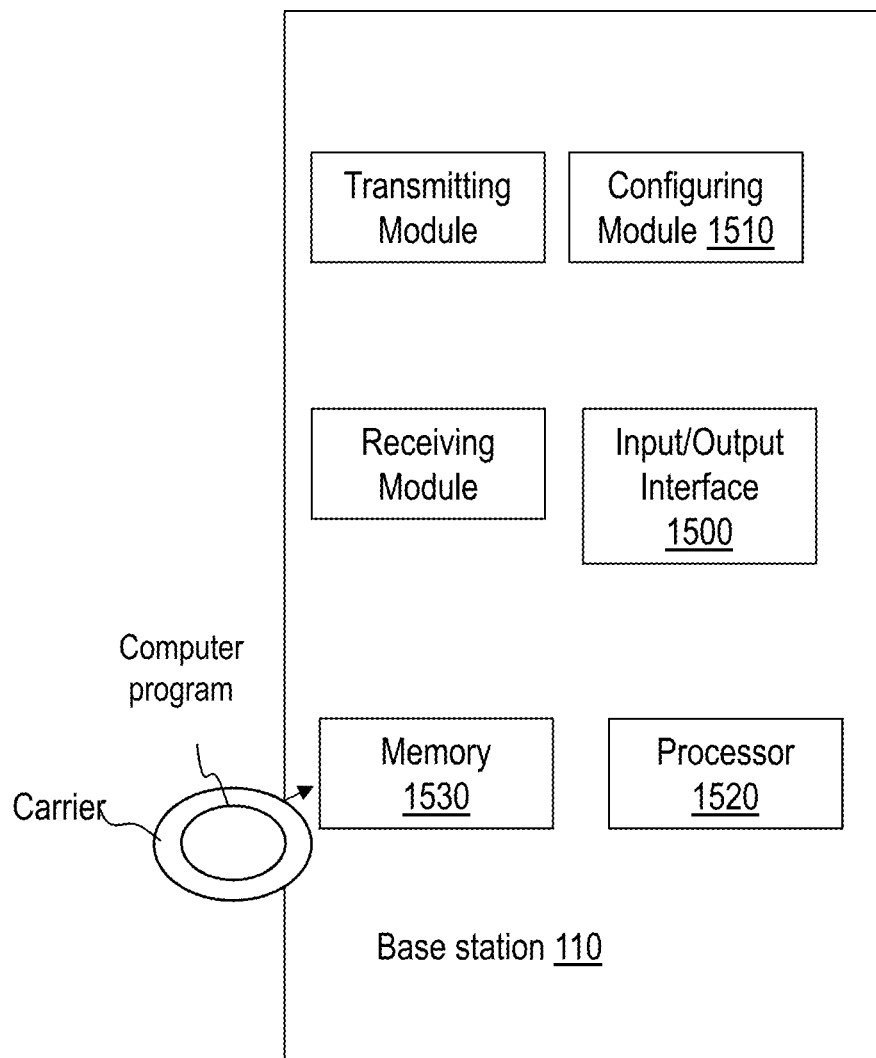

To perform the method actions for configuring the UE 120 to monitor a beam transmitted the a base station 110 in a radio communications network 100, the base station 110 may comprise the arrangement depicted in FIG. 15. The UE 120 is adapted to be served by the base station 110.

The base station 110 is adapted to, e.g. by means of a configuring module 1510 in the UE 120, configure the UE 120 to:

Monitor a reference signal related to the beam, from the base station 110.

Each time a quality of the reference signal is below a first threshold, generate an OOS event.

When the number of OOS events reaches an OOS BFD threshold, trigger a beam recovery preparation procedure, and when the number of OOS events reaches an OOS RLM, threshold, start an RLF timer.

The base station 110 may further be adapted to, e.g. by means of the configuring module 1510 in the UE 120, configure the UE 120 to, each time a quality of the reference signal is above a second threshold, generate an IS event.

The base station 110 may further be adapted to, e.g. by means of a configuring module 1510 in the UE 120, configure the UE 120 to trigger the beam recovery preparation procedure to be performed when furthermore, the number of IS events is below an IS BFD threshold.

The base station 110 may further be adapted to, e.g. by means of a configuring module 1510 in the UE 120, configure the UE 120 to start the RLF timer when furthermore, the number of IS events is below an IS RLM threshold.

The base station 110 may further be adapted to, e.g. by means of a configuring module 1510 in the UE 120, configure the UE 120 to start the RLF timer and to further start to count IS events.

The base station 110 may further be adapted to, e.g. by means of a configuring module 1510 in the UE 120, configure the UE 120 to, if the RLF timer expires while the number of counted IS events have not reached the IS RLM threshold, declare Radio Link Failure.

The base station 110 may further be adapted to, e.g. by means of a configuring module 1510 in the UE 120, configure the UE 120 to, if the number of counted IS events reaches the IS RLM threshold while the RLF timer is running, stop the RLF timer.

The OOS RLM threshold and the OOS BFD may be adapted to be configured such that the beam recovery preparation procedure is triggered before declaring Radio Link Failure.

The IS RLM threshold and the IS BFD threshold may be adapted to be configured such that the beam recovery preparation procedure is triggered before declaring Radio Link Failure.

The UE 120 may comprise an input and output interface 1400 configured to communicate with the base station 110.

The input and output interface 1400 may comprise a wireless receiver (not shown) and a wireless transmitter (not shown).

The base station 110 may comprise an input and output interface 1500 configured to communicate with the UE 120. The input and output interface 1500 may comprise a wireless receiver (not shown) and a wireless transmitter (not shown).

The embodiments herein may be implemented through a respective processor or one or more processors, such as the respective processor 1520 of a processing circuitry in the base station 110 depicted in FIG. 15 and processor 1460 of a processing circuitry in the UE 120 depicted in FIG. 14, together with respective computer program code for performing the functions and actions of the embodiments herein. The program code mentioned above may also be provided as a computer program product, for instance in the form of a data carrier carrying computer program code for performing the embodiments herein when being loaded into the respective base station 110 and UE 120. One such carrier may be in the form of a CD ROM disc. It is however feasible with other data carriers such as a memory stick. The computer program code may furthermore be provided as pure program code on a server and downloaded to the respective base station 110 and UE 120.

The base station 110 and UE 120 may further comprise respective a memory 1470 1530 comprising one or more memory units. The memory comprises instructions executable by the processor in the respective base station 110 and UE 120.

The memory is arranged to be used to store e.g. feedback options, information, data, configurations, and applications to perform the methods herein when being executed in the respective base station 110 and UE 120.

In some embodiments, a respective computer program comprises instructions, which when executed by the respective at least one processor, cause the at least one processor of the respective base station 110 and UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Figure 16:
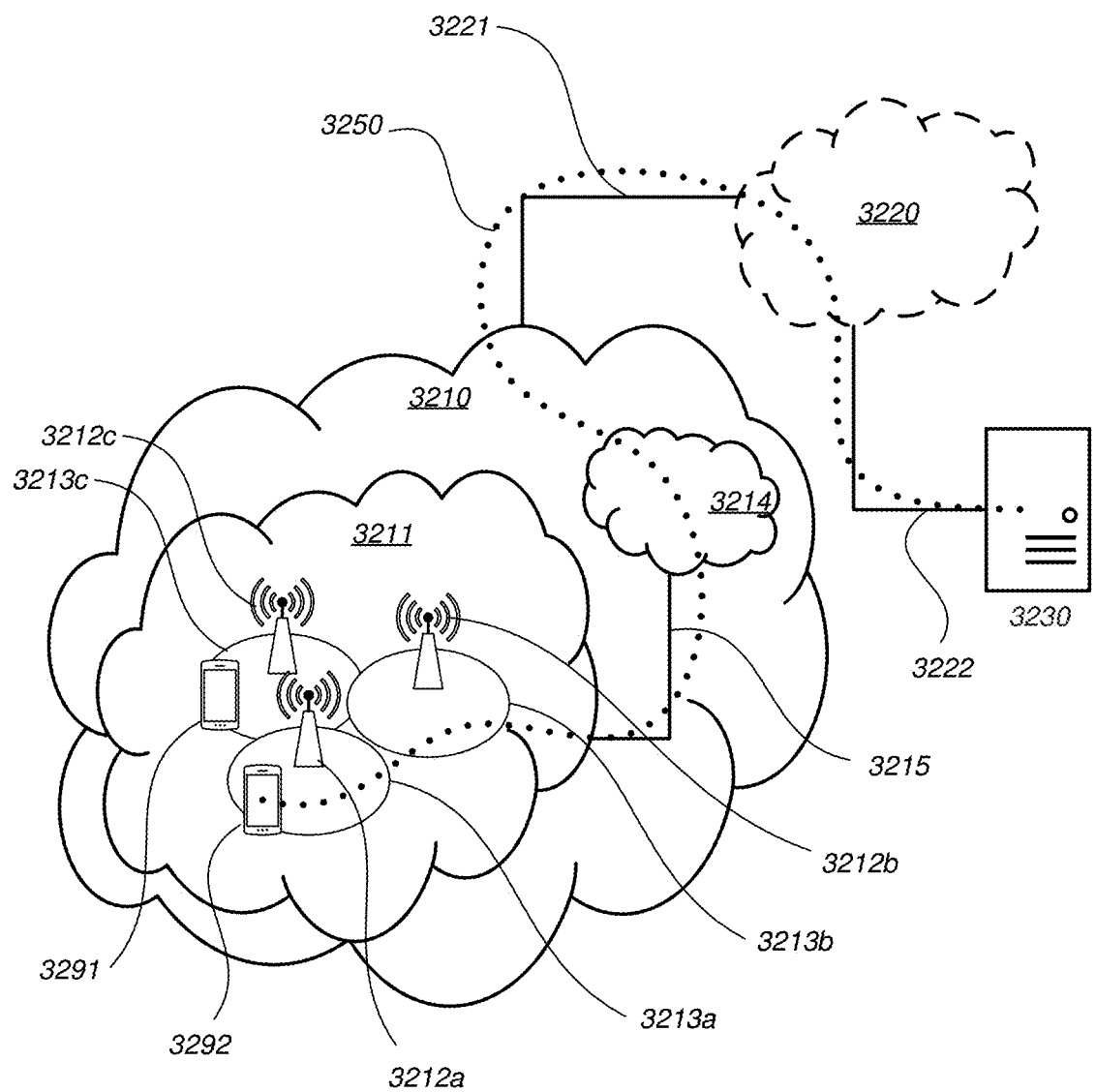
FIG. 16 schematically illustrates a telecommunication network connected via an intermediate network to a host computer.

With reference to FIG. 16, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 17:
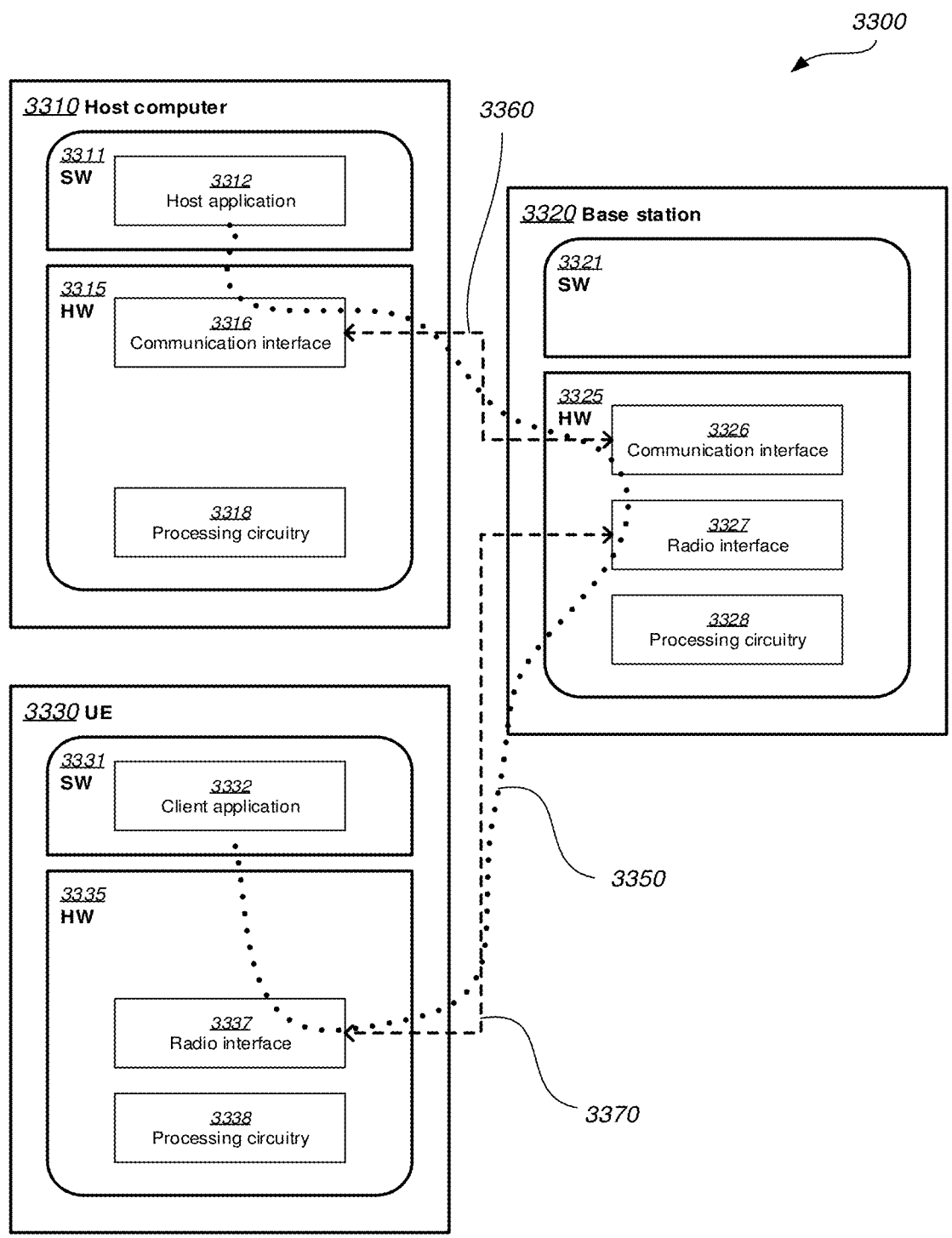
FIG. 17 is a generalized block diagram of a host computer communicating via a base station with a user equipment over a partially wireless connection.

It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 18, 19:
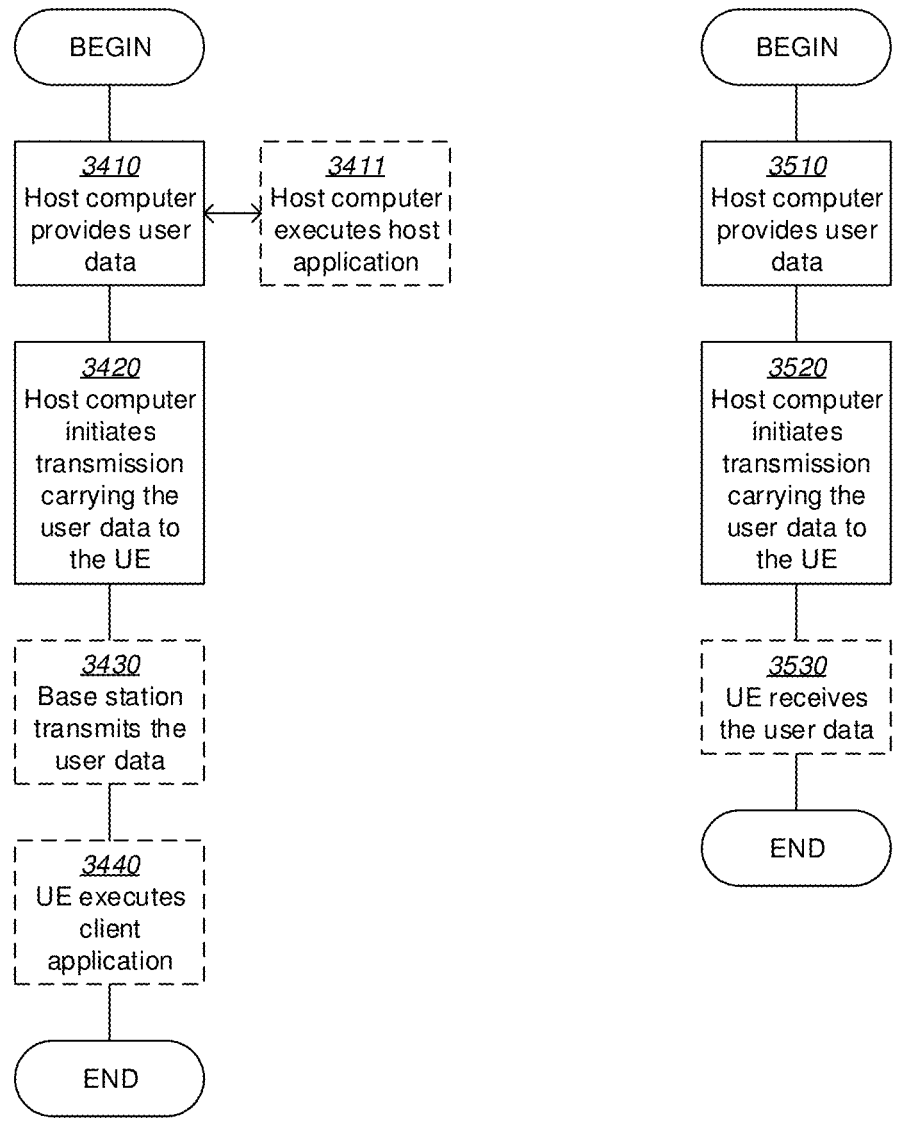
FIGS. 18 to 21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 18 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 19 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 20, 21:
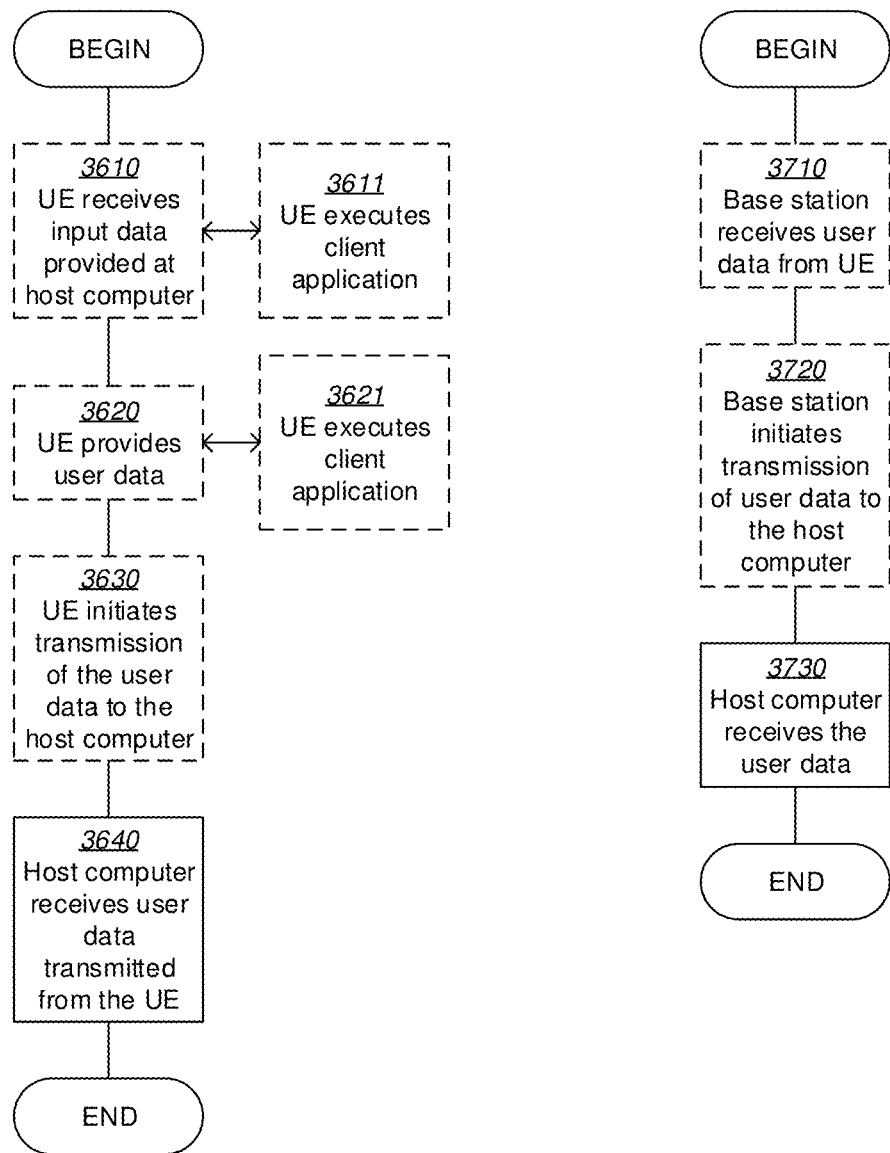

FIG. 20 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 20 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 21 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Some Example Embodiments Numbered 1-9 are Described Below

The following embodiments refer to FIG. 11, FIG. 12, FIG. 13, FIG. 14 and FIG. 15.

Embodiment 1. A method performed by a User Equipment, UE, 120, e.g. for monitoring a beam transmitted by a base station 110 in a radio communications network 100, which base station 110 is serving the UE 120, the method comprising one or more out of:
  monitoring 1202 a reference signal related to the beam, from the base station 110,
  each time a quality of the reference signal is below a first threshold, generating 1203 an Out-Of-Synchronization, OOS, event,
  each time a quality of the reference signal is above a second threshold, generating 1204 an In-Synchronization, IS, event,
  when the number of OOS events exceeds such as reaches an OOS Beam Failure Detection, BFD, threshold, and possibly the number of IS events is below an IS BFD threshold, triggering 1205 a beam recovery preparation procedure,
  when the number of OOS events reaches an OOS Radio Link Monitoring, RLM, threshold and possibly the number of IS events is below an IS RLM threshold, declaring 1206 Radio Link Failure related to the beam,
  wherein OOS RLM threshold and the OOS BFD threshold and possibly the wherein IS RLM threshold and the IS BFD threshold are configured such that the beam recovery preparation procedure is triggered before declaring Radio Link Failure.

Embodiment 2. The method according to embodiment 1, receiving 1201 from the base station 110 a configuration comprising at least one reference signal related to the beam, which reference signal is to be monitored by the UE 120 for Beam Failure Detection, BFD, and cell-level Radio Link Monitoring, RLM, Embodiment 3. A computer program comprising instructions, which when executed by a processor, cause the processor to perform actions according to any of the embodiment 1-2.

Embodiment 4. A carrier comprising the computer program of embodiment 3, wherein the carrier is one of an electronic signal, an optical signal, an electromagnetic signal, a magnetic signal, an electric signal, a radio signal, a microwave signal, or a computer-readable storage medium.

Embodiment 5. A method performed by a Base station 110, e.g. for configuring a UE 120 to monitor a beam transmitted the a base station 110 in a radio communications network 100, which base station 110 is serving the UE 120, the method comprising configuring 1301 a UE 120 to one or more out of:
  monitor a reference signal related to the beam, from the base station 110, and
  each time a quality of the reference signal is below a first threshold, generate an Out-Of-Synchronization, OOS, event,
  each time a quality of the reference signal is above a second threshold, generate an In-Synchronization, IS, event,
  when the number of OOS events reaches an OOS Beam Failure Detection, BFD, threshold, and possibly the number of IS events is below an IS BFD threshold, trigger a beam recovery preparation procedure,
  when the number of OOS events reaches an OOS Radio Link Monitoring, RLM, threshold and possibly the number of IS events is below an IS RLM threshold, declare Radio Link Failure related to the beam,
  wherein the OOS RLM threshold and the OOS BFD threshold and possibly also the IS RLM threshold and the IS BFD threshold, are configured such that the beam recovery preparation procedure is triggered before declaring Radio Link Failure.

Embodiment 6. A computer program comprising instructions, which when executed by a processor, cause the processor to perform actions according to any of the embodiment 5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A User Equipment, UE, 120, e.g. for monitoring a beam transmitted by a base station 110 in a radio communications network 100, which base station 110 is adapted to serve the UE 120, wherein the UE 120 is configured to one or more out of:
  monitor a reference signal related to the beam, from the base station 110, e.g. by means of a monitoring module 1410 in the UE 120, and each time a quality of the reference signal is below a first threshold, generate an Out-Of-Synchronization, OOS, event, e.g. by means of a generating module 1420 in the UE 120, each time a quality of the reference signal is above a second threshold, generate an In-Synchronization, IS, event, e.g. by means of the generating module 1420 in the UE 120, when the number of OOS events reaches an OOS Beam Failure Detection, BFD, threshold, and possibly the number of IS events is below an IS BFD threshold, trigger a beam recovery preparation procedure, e.g. by means of a triggering module 1430 in the UE 120, when the number of OOS events reaches an OOS Radio Link Monitoring, RLM, threshold and possibly the number of IS events is below an IS RLM threshold, declare Radio Link Failure related to the beam, e.g. by means of a declaring module 1440 in the UE 120, wherein the OOS RLM threshold and the OOS BFD threshold and possibly also the IS RLM threshold and the IS BFD threshold, are configured such that the beam recovery preparation procedure is triggered before declaring Radio Link Failure.

Embodiment 9. The UE 120 according to embodiment 8, wherein the UE 120 is configured to.

receive from the base station 110 a configuration comprising at least one reference signal related to the beam, which reference signal is to be monitored by the UE 120 for Beam Failure Detection, BFD, and cell-level Radio Link Monitoring, RLM, e.g. by means of a receiving module 1450 in the UE 120.

Embodiment 10. A Base station 110, e.g. for configuring a UE 120 to monitor a beam transmitted the a base station 110 in a radio communications network 100, which base station 110 is serving the UE 120, the base station 110 being adapted to configure the UE 120, e.g. by means of a configuring module 1510 in the base station 110, to one or more out of:

monitor a reference signal related to the beam, from the base station 110, and each time a quality of the reference signal is below a first threshold, generate an Out-Of-Synchronization, OOS, event, each time a quality of the reference signal is above a second threshold, generate an In-Synchronization, IS, event, when the number of OOS events reaches an OOS Beam Failure Detection, BFD, threshold, and possibly the number of IS events is below an IS BFD threshold, trigger a beam recovery preparation procedure, when the number of OOS events reaches an OOS Radio Link Monitoring, RLM, threshold and possibly the number of IS events is below an IS RLM threshold, declare Radio Link Failure related to the beam, wherein the OOS RLM threshold and the OOS BFD threshold and possibly also the IS RLM threshold and the IS BFD threshold, are configured such that the beam recovery preparation procedure is triggered before declaring Radio Link Failure.

Those skilled in the art will also appreciate that the modules in the respective base station 110 and UE 120, described above may refer to a combination of analog and digital circuits, and/or one or more processors configured with software and/or firmware, e.g. stored in the UE 120 and/or the base station 110, that when executed by the respective one or more processors such as the processors described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

What is claimed is:

1. A user equipment (UE) having a client application stored in a computer-readable storage medium, the client application being associated with an over-the-top (OTT) service and executable on the UE to transmit user data to a host application associated with the OTT service via a wireless communication network, the client application being operable to initiate transmission of the user data to or from the host application by processing circuitry and transceiver circuitry of the UE, the UE being configured to:
   monitor a reference signal related to a beam transmitted by a base station serving the UE;
   generate an Out-Of-Synchronization (OOS) event each time a quality of the reference signal is below a first threshold;
   trigger a beam recovery preparation procedure when the number of OOS events reaches an OOS Beam Failure Detection (BFD) threshold, the OOS BFD threshold being lower than an OOS Radio Link Monitoring (RLM) threshold used by the UE for starting a radio link failure (RLF) timer; and
   receive or transmit user data.

2. The UE of claim 1, the UE further configured to:
   receive, from the base station, a configuration comprising at least one reference signal related to the beam, which reference signal is to be monitored by the UE for BFD and cell-level RLM.

3. The UE of claim 1, the UE further configured to:
   each time a quality of the reference signal is above a second threshold, generate an In-Synchronization (IS) event.

4. The UE of claim 3, wherein:
   triggering the beam recovery preparation procedure is performed when furthermore, a number of IS events is below an IS BFD threshold.

5. A host computer configured to operate in a communication system to provide an over-the-top (OTT) service, the host computer comprising:
   processing circuitry configured to initiate transmissions to receive or provide user data associated with the OTT service; and
   a network interface configured to facilitate reception or transmission of the user data from a user equipment (UE) via a network node in a cellular network, the network node having a communication interface and processing circuitry, the processing circuitry of the network node configured to perform operations comprising:
      configuring a UE to monitor a reference signal related to a beam transmitted by the network node;
      configuring the UE with an OOS Beam Failure Detection (BFD) threshold to be used by the UE to trigger a beam recovery preparation procedure when a number of out-of-synchronization (OOS) events generated by the UE reaches the OOS BFD threshold, the OOS BFD threshold being lower than an OOS Radio Link Monitoring (RLM) threshold used by the UE for starting a radio link failure (RLF) timer; and
continuing transmission of user data based on the beam recovery preparation procedure.

6. The host computer of claim 5, the operations further comprising:
configuring the UE with a second threshold to be used by the UE to, each time a quality of the reference signal is above a second threshold, generate an In-Synchronization (IS) event.

7. The host computer of claim 6, the operations further comprising:
configuring the UE with an in-sync (IS) BFD threshold to be used by the UE to trigger the beam recovery preparation procedure when, furthermore, a number of IS events is below the IS BFD threshold.

8. The host computer of claim 7, the operations further comprising:
configuring the UE with an IS RLM threshold to be used by the UE to start the RLF timer when, furthermore, the number of IS events is below the IS RLM threshold.

9. A non-transitory computer-readable storage medium comprising, stored thereupon, a client application associated with a UE operable in a wireless communication network, the client application being executable on the UE to transmit or receive user data to or from a host application associated with a host computer providing an over-the-top (OTT) service via the wireless communication network, the client application comprising instructions configured to cause the UE to:
initiate transmission of the user data to or from the host application by processing circuitry and transceiver circuitry of the UE, the UE being configured to:
monitor a reference signal related to a beam transmitted by a network node serving the UE;
generate an Out-Of-Synchronization (OOS) event each time a quality of the reference signal is below a first threshold;
trigger a beam recovery preparation procedure when the number of OOS events reaches an OOS Beam Failure Detection (BFD) threshold, the OOS BFD threshold being lower than an OOS Radio Link Monitoring (RLM) threshold used by the UE for starting a radio link failure (RLF) timer; and
receive or transmit user data.

10. The non-transitory computer-readable storage medium of claim 9, wherein the client application further comprises instructions configured to cause the UE to:
receive from the network node a configuration comprising at least one reference signal related to the beam, which reference signal is to be monitored by the UE for BFD, and cell-level RLM.

11. The non-transitory computer-readable storage medium of claim 9, wherein the client application further comprises instructions configured to cause the UE to:
each time a quality of the reference signal is above a second threshold, generate an In-Synchronization (IS) event.

12. The non-transitory computer-readable storage medium of claim 11, wherein the client application further comprises instructions configured to cause the UE to:
trigger the beam recovery preparation procedure when, furthermore, a number of IS events is below an IS BFD threshold.

13. The non-transitory computer-readable storage medium of claim 11, wherein the client application further comprises instructions configured to cause the UE to start the RLF timer when, furthermore, the number of IS events is below an IS RLM threshold.

14. A communication system operable to enable provision of an over-the-top (OTT) service, the communication system comprising:
a host computer configured to provide the OTT service, the host computer comprising:
processing circuitry configured to initiate transmissions to receive or provide user data associated with the OTT service; and
a network interface configured to facilitate reception or transmission of the user data from a user equipment (UE) via a network node in a cellular network, the network node having a communication interface and processing circuitry, the processing circuitry of the network node configured to perform operations comprising:
configuring a UE to monitor a reference signal related to a beam transmitted by the network node;
configuring the UE with an OOS Beam Failure Detection (BFD) threshold to be used by the UE to trigger a beam recovery preparation procedure when a number of out-of-synchronization (OOS) events generated by the UE reaches the OOS BFD threshold, the OOS BFD threshold being lower than an OOS Radio Link Monitoring (RLM) threshold used by the UE for starting a radio link failure (RLF) timer; and
continuing transmission of user data based on the beam recovery preparation procedure.

* * * * *